US011223236B2

(12) United States Patent
Van Wageningen et al.

(10) Patent No.: US 11,223,236 B2
(45) Date of Patent: Jan. 11, 2022

(54) WIRELESS INDUCTIVE POWER TRANSFER

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 676 days.

(21) Appl. No.: 16/078,147

(22) PCT Filed: Feb. 20, 2017

(86) PCT No.: PCT/EP2017/053731
§ 371 (c)(1),
(2) Date: Aug. 21, 2018

(87) PCT Pub. No.: WO2017/144387
PCT Pub. Date: Aug. 31, 2017

(65) Prior Publication Data
US 2021/0194284 A1    Jun. 24, 2021

(30) Foreign Application Priority Data
Feb. 24, 2016  (EP) ..................... 16157039

(51) Int. Cl.
*H02J 50/12* (2016.01)
*H02J 50/80* (2016.01)
*H04B 5/00* (2006.01)

(52) U.S. Cl.
CPC .............. *H02J 50/12* (2016.02); *H02J 50/80* (2016.02); *H04B 5/0031* (2013.01); *H04B 5/0037* (2013.01)

(58) Field of Classification Search
CPC ........ H02J 50/12; H02J 50/80; H04B 5/0031; H04B 5/0037
(Continued)

(56) References Cited

U.S. PATENT DOCUMENTS 7,190,153 B2    3/2007  Stover et al.
2012/0001485 A1*  1/2012  Uchida ................... H02J 50/12
                                                              307/11
(Continued)

FOREIGN PATENT DOCUMENTS

GB      2524602 A       9/2015
WO      2012172410 A1  12/2012
(Continued)

OTHER PUBLICATIONS

Wireless Power Consortium, Accessed Aug. 17, 2018, http://wirelesspowerconsortium.com/index.html.
(Continued)

*Primary Examiner* — William Hernandez

(57) ABSTRACT

A power transmitter (101) of a wireless power transfer system provides wireless power to a power receiver (105). The power transmitter (101) comprises a variable resonance circuit (201) generating an inductive power transfer signal in response to a drive signal. The resonance circuit comprises a capacitive and inductive impedance (201, 203), at least one of which is variable. The resonance frequency can be varied by at least one of the impedances being variable in response to a control signal. A driver (205) generates the drive signal with a variable drive frequency. A frequency modulator (305) applies frequency modulation to the drive signal by varying the variable drive frequency in response to data values to be transmitted to the power receiver (105). An adapter (309) generates the control signal in response to the data values such that the variable resonance frequency
(Continued)

follows the variations in the drive frequency resulting from the frequency modulation of the drive signal.

20 Claims, 20 Drawing Sheets

(58) Field of Classification Search
USPC .......................................................... 307/104
See application file for complete search history.

(56) References Cited

U.S. PATENT DOCUMENTS

| | | |
|---|---|---|
| 2015/0115735 A1 | 4/2015 | Singh et al. |
| 2016/0344237 A1* | 11/2016 | Cho ........................ H02J 50/80 |
| 2016/0352390 A1* | 12/2016 | Park ...................... H04B 5/0037 |
| 2017/0110913 A1* | 4/2017 | Shin ........................ H02J 50/12 |
| 2018/0219419 A1* | 8/2018 | Ettes ................... H02M 3/3376 |

FOREIGN PATENT DOCUMENTS

| | | |
|---|---|---|
| WO | 2016041880 A1 | 3/2016 |
| WO | 2016041889 A1 | 3/2016 |

OTHER PUBLICATIONS

"The Qi Wireless Power Transfer System Power Class 0 Specification Parts 1 and 2: Interface Definitions", Version 1.2.1, Oct. 2015.

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2017/053731, filed on 20 Feb. 2017, which claims the benefit of European Patent Application No. 16157039.5, filed on 24 Feb. 2016. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor and a secondary receiver coil. By separating the primary transmitter inductor and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter inductor in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Many wireless power transmission systems, such as e.g. Qi, supports communication from the power receiver to the power transmitter thereby enabling the power receiver to provide information to the power transmitter that may allow this to adapt to the specific power receiver or the specific conditions experienced by the power receiver.

In many systems, such communication is by load modulation of the power transfer signal. Specifically, the communication is achieved by the power receiver performing load modulation wherein a load applied to the secondary receiver coil by the power receiver is varied to provide a modulation of the power signal. The resulting changes in the electrical characteristics (e.g. variations in the current of the transmitter inductor) can be detected and decoded (demodulated) by the power transmitter.

More information of the application of load modulation in Qi can e.g. be found in Section 5.2 of part 1&2 (version 1.2).

In addition to load modulation communication from the power receiver to the power transmitter, it has been proposed to support communication from the power transmitter to the power receiver. Such communication has been proposed to be implemented by modulating the power signal. The modulation has been proposed to be amplitude modulation which can be detected by the power receiver. However, AM modulation may be sensitive to noise, and in particular may be sensitive to noise resulting from e.g. changes in the load of the power signal by the power receiver.

It has also been proposed to use frequency modulation, and specifically frequency shift keying (FSK), for communication from the power transmitter to the power receiver. Frequency modulation may be less sensitive to amplitude noise and may interfere less with the power transfer operation. However, the application of frequency modulation in a power transfer system is substantially different, and typically more difficult, to implement than when using frequency modulation for conventional communications, such as specifically conventional radio communication.

For example, power transfer is often achieved using resonance circuits at both the power transmitter and the power receiver. Thus, rather than merely feeding a drive signal to a transmitter coil, the output of the power transmitter comprises a resonance circuit including the transmitter coil. This may provide higher efficiency and an improved power transfer. Further, the resonance circuit of the power transmitter and the power receiver are (loosely) coupled and thus have a completely different relationship than exists between a radio transmitter and receiver.

The use of frequency modulation in a power transfer system may accordingly result in a number of additional challenges and difficulties. Indeed, the frequency modulation and power transfer operations may interference with each other. Thus, the frequency modulation may impact the power transfer operation, and the power transfer operation may impact the frequency modulation communication.

For example, the power transfer and indeed communication properties may be dependent on the frequency of the drive signal, and thus the frequency variations introduced by the frequency modulation may result in variations in the power transfer operation.

Hence, an improved approach would be advantageous. In particular, an approach that allows improved operation, improved power transfer, increased flexibility, facilitated implementation, facilitated operation, improved communication, reduced communication errors, improved support for frequency modulation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter for wirelessly providing power to a power receiver via an inductive power transfer signal; the power transmitter comprising: a variable resonance circuit for generating the inductive power transfer signal in response to a drive signal, the variable resonance circuit comprising a capacitive impedance and an inductive impedance comprising a transmitter coil for generating the inductive power transfer signal, the resonance circuit having a variable resonance frequency by at least one of the inductive impedance and the capacitive impedance being a variable impedance having an impedance controllable by a control signal; a driver for generating the drive signal for the variable resonance circuit, the drive signal having a variable drive frequency; a frequency modulator for applying a frequency modulation to the drive signal by varying the variable drive frequency in response to data values to be transmitted to the power receiver; and an adapter for generating the control signal in response to the data values such that the variable resonance frequency follows variations in the variable drive frequency resulting from the frequency modulation of the drive signal.

The invention may provide improved performance in many wireless power transfer systems. It may provide facilitated and/or improved communication in many scenarios and may in particular provide improved operation during transmission of data from the power transmitter to the power receiver using frequency modulation. In many embodiments, the approach may allow a reduced amplitude variation of the voltage induced at the power receiver. In particular, the approach may in many scenarios reduce the risk of over-voltage or under-voltage conditions at the receiver and/or may facilitate voltage regulation by providing a less varying voltage at the power receiver. The approach may reduce and potentially remove frequency modulation to amplitude modulation conversion in a wireless power transfer system.

The variable resonance frequency may follow the variable drive frequency such that they match each other. The adapter may generate the control signal such that it causes the variable impedance to vary such that resulting variations in the variable resonance frequency follow variations in the drive frequency resulting from the frequency modulation. The adapter may generate the control signal such that the variable resonance frequency and drive frequency is substantially the same during frequency modulation. The adapter and variable resonance circuit may be arranged to vary the variable resonance frequency to track changes in the drive frequency resulting from the frequency modulation.

The variable resonance frequency may follow the drive frequency such that an increasing drive frequency (or a deviation or offset caused by the frequency modulation) results in an increasing resonance frequency (or offset or deviation). Correspondingly, a decreasing drive frequency (or a deviation or offset caused by the frequency modulation) may result in a decreasing resonance frequency (or offset or deviation).

In some embodiments, the variable resonance frequency may follow the drive frequency such that an increasing offset in the variable drive frequency resulting from the frequency modulation results in an increasing (offset in the) variable resonance frequency (and/or a decreasing offset in the variable drive frequency resulting from the frequency modulation results in a decreasing (offset in the) resonance frequency). In many embodiments, the adapter is arranged to generate the control signal to cause a change (or deviation or offset) the variable resonance frequency in response to the data values which is in the same direction as a change (or deviation or offset) in the variable drive frequency in response to the data values. In many embodiments, the changes/offsets/deviations in the drive frequency and the variable frequency may further be substantially the same magnitude.

Thus, if the frequency deviation due to frequency modulation corresponds to an increase in the variable drive frequency, the adapter may generate the control signal to cause a frequency deviation in response to the data values which also increases the variable resonance frequency. Correspondingly, if the frequency deviation due to frequency modulation correspond to a decrease in the variable drive frequency, the adapter may generate the control signal to cause a frequency deviation in response to the data values which also decreases the variable resonance frequency.

In many embodiments, the adapter may be arranged to generate the control signal to adjust the variable resonance frequency to correspond to a monotonically increasing function of the variable drive frequency.

In many embodiments, the adapter may be arranged to generate the control signal to introduce a frequency deviation or offset of the variable resonance frequency to correspond to a monotonically increasing function of a frequency deviation or offset of the variable drive frequency resulting from the frequency modulation.

In the system, the controller may thus control the variable resonance frequency to vary in line with dynamic variations in the variable drive frequency (due to frequency modulation).

Specifically, in the system, the control signal can be arranged to change such that the variations in the variable resonance frequency match the variations in the drive frequency resulting from the frequency modulation.

In many embodiments, the frequency modulation may introduce frequency deviations relative to a nominal drive frequency. The nominal drive frequency may be variable and may specifically be varied in response to power control messages received from the power receiver. The frequency deviations of the frequency modulation are dependent on the data values being transmitted. The adapter may be arranged to introduce corresponding frequency deviations to the resonance frequency relative to a nominal resonance frequency. The nominal resonance frequency may be different to the nominal drive frequency. In many embodiments, the nominal resonance frequency may have a frequency offset relative to the drive frequency. The frequency offset may e.g. be determined in response to power control messages from the power receiver. The adapter may be arranged to vary the resonance frequency in response to the frequency modulation (and thus in response to the data values) while being arranged to not vary the resonance frequency in response to power control messages received from the power receiver. The power transmitter may be arranged to vary the drive frequency in response to both the data values and in response to power control messages received from the power receiver.

The adapter may generate the control signal to be synchronized to frequency variations caused by the frequency modulation. The control signal may synchronize variations in the resonance frequency to variations in the drive frequency caused by the frequency modulation.

The variable resonance circuit may comprise a resonance modification circuit arranged to vary the variable impedance in response to the control signal. The adapter and the resonance modification circuit may be arranged to vary the resonance frequency to match variations in the drive frequency resulting from the frequency modulation. The resonance modification circuit may e.g. include a switch switching the variable impedance between different impedances corresponding to different resonance frequencies. Each resonance frequency may correspond to a frequency used by the frequency modulation. The resonance modification circuit may be arranged to switch between the variable resonance frequencies in response to the control signal. The adapter may generate the control signal to be a switch signal switching the variable impedance between the different impedances such that the impedance corresponding to the resonance frequency matching the drive frequency currently being applied to the drive signal by the frequency modulator is selected.

The frequency modulation may specifically be a frequency shift keying. The control signal, and the changes in the resonance frequency, may be synchronized to frequency changes due to the frequency shift keying.

In accordance with an optional feature of the invention, the frequency modulator is arranged to select the variable drive frequency from a set of frequencies in response to the data values; and the adapter is arranged to generate the control signal to adapt the variable impedance between a set of impedances corresponding to variable resonance frequencies corresponding to the set of frequencies.

This may allow facilitated and/or improved operation in many embodiments. It may typically allow a closer correspondence between the resonance frequency and the drive frequency, and may reduce amplitude variations at the receiver caused by the frequency modulation of the drive signal.

The frequency modulation may specifically be a frequency shift keying, and specifically may be a frequency shift keying wherein data values are represented by predetermined patterns of a selected subset of discrete frequencies.

The set of frequencies may in many embodiments consist of two frequencies.

In accordance with an optional feature of the invention, the adapter is arranged to generate the control signal to have transitions synchronized to transitions of the variable drive frequency between the set of frequencies.

This may allow improved and/or facilitated operation, and may typically reduce amplitude variations at the power receiver resulting from the frequency modulation.

In accordance with an optional feature of the invention, the adapter is arranged to generate the control signal to have transitions synchronized to data symbol times for the frequency modulation.

This may allow improved and/or facilitated operation, and may typically reduce amplitude variations at the power receiver resulting from the frequency modulation.

The transitions in the control signal cause transitions in the variable impedance and this may result in transitions in the resonance frequency.

In most embodiments, at least some control signal transitions will be synchronized with the channel data symbol times. In some embodiments, all control signal transitions will be synchronized with the data symbol times.

The data symbol times are specifically channel data symbol times, i.e. they relate to the symbols that are actually communicated on the channel rather than information symbols corresponding to the data values. In accordance with general communication theory, an information symbol representing a data value may be encoded as one or more channel data symbols. The synchronization of the control signal may be to symbol times of the channel data symbols.

The control signal is specifically generated to have transitions synchronized to data symbol times for the frequency modulation.

In accordance with an optional feature of the invention, the variable resonance circuit comprises a switch for limiting a current flow to a reactive component of the variable impedance in response to the control signal.

This may provide an efficient approach for generating a variable impedance, and thus for controlling the resonance frequency. The limitation of the current flow to a reactive component may result in the effective impedance of the reactive component and the slowing of the current flow being changed relative to the impedance of the reactive component if no current flow limitation is imposed. The current flow may be impeded by restricting or limiting a current or by bypassing the reactive component.

The reactive component may be a capacitor or inductor.

In accordance with an optional feature of the invention, the variable impedance comprises the capacitive impedance and the resonance circuit comprises a switch arranged to at least one of short circuiting and disconnecting a capacitor of the capacitive impedance in response to the control signal.

This may provide an efficient approach for generating a variable impedance.

In accordance with an optional feature of the invention, the variable impedance comprises the inductive impedance and the resonance circuit comprises a switch arranged to at least one of short circuiting and disconnecting an inductor of the inductive impedance in response to the control signal.

This may provide an efficient approach for generating a variable impedance.

In accordance with an optional feature of the invention, the control signal is a binary control signal and the switch is arranged to be in an open state for a first value of the binary control signal and to be in a closed state for a second value of the binary control signal.

This may provide an efficient approach for generating a variable impedance.

In accordance with an optional feature of the invention, the adapter is arranged to change the control signal only when the frequency modulation causes the variable drive frequency to change.

This may allow improved operation and/or performance in many embodiments.

In accordance with an optional feature of the invention, the resonance circuit comprises a resonance modification circuit for controlling the variable resonance frequency by slowing a state change for at least one of the capacitive impedance and the inductive impedance for a fractional time interval of at least some cycles of the drive signal, the resonance modification circuit being arranged to adapt the duration of the fractional time interval in response to the control signal.

This may provide a particularly advantageous operation in many embodiments and may in particular provide efficient yet low complexity and easy to implement adaptation of the resonance frequency to follow the drive frequency. A fast and accurate adaptation and matching to the drive frequency variations may be achieved.

The slowing of the state change may be a slowing relative to a resonance circuit including only the capacitive impedance and the inductive impedance. Such a circuit may have a (free running) resonance frequency (referred to as the natural resonance frequency) which is higher than the effective resonance frequency resulting from the state change being slowed.

The slowing of the state change results in a modified (effective) impedance. The capacitive impedance and the inductive impedance may typically be coupled in a series or parallel resonance configuration. The state may specifically be an energy state, and specifically may be a voltage across the capacitive impedance and/or a current through the inductive impedance.

The fractional time interval has a duration which is less than half a time period of the drive signal. The start time and end times may typically be time instants relative to a time instant/event of each cycle (in which a fractional time interval is present). For example, the start time and end time may be considered relative to a zero crossing of the drive signal.

The fractional time interval may specifically be a time interval occurring in a plurality of (but not necessarily all or consecutive) cycles of the drive signal and having a duration of less than a cycle/time period of a cycle of the drive signal.

The capacitive impedance may typically be a capacitor and the inductive impedance may typically be an inductor. However, in some embodiments, the capacitive impedance and/or the inductive impedance may e.g. also include a resistive component.

The resonance frequency may typically be increasingly reduced the longer the duration of the fractional time interval. The resonance modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be reduced by the adapter increasing the duration of the fractional time interval, e.g. by changing the start time and/or end time for the fractional time interval.

In some embodiments, the power transmitter may be arranged to reduce the resonance frequency by increasing the duration of the fractional time interval.

In some embodiments, the resonance modification circuit is arranged to slow the state change by impeding an energy flow between the inductive impedance and the capacitive impedance during the fractional time interval.

This may provide improved performance in many scenarios, and may in particular provide an effective adjustment of the resonance frequency. The approach may facilitate implementation. The energy flow may be impeded while being from the capacitive impedance to the inductive impedance, from the inductive impedance to the capacitive impedance, or both when it is from the inductive impedance to the capacitive impedance and when it is from the capacitive impedance to the inductive impedance.

Impeding energy flow may include both reducing energy flow and completely preventing any energy flow.

In many embodiments, the resonance modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing (blocking) any current flow.

In some embodiments, the resonance modification circuit is arranged to slow the state change for the inductive impedance by impeding current flow from the capacitive impedance to the inductive impedance during the fractional time interval.

In accordance with an optional feature of the invention, the resonance modification circuit is arranged to determine one of a start time and an end time of the fractional time interval in response to a signal of the variable resonance circuit and to determine the other of the start time and the end time in response to the control signal.

This may facilitate control of the resonance frequency by the adapter. In many embodiments, it may allow an automatic determination of at least one of the start and end times allowing the active control by the adapter to only consider one time instant. E.g. if a switch is used to control the slowing of the state change, the approach may in many scenarios allow that only one of the switch-on and switch-off times needs to be accurately controlled.

In accordance with an optional feature of the invention, the frequency modulator is arranged to cause frequency transitions in the variable drive frequency, and the adapter is arranged to generate the control signal to cause transitions in the variable resonance frequency which are synchronized to the frequency transitions for the variable drive frequency.

In accordance with an optional feature of the invention, the frequency modulator is arranged to cause frequency transitions during a data symbol, and the adapter is arranged to generate the control signal to cause transitions in the variable resonance frequency during the data symbol.

According to an aspect of the invention there is provided a wireless power transfer system comprising a power transmitter for wirelessly providing power to a power receiver via an inductive power transfer signal; the power transmitter comprising: a variable resonance circuit for generating the inductive power transfer signal in response to a drive signal, the variable resonance circuit comprising a capacitive impedance and an inductive impedance comprising a transmitter coil for generating the inductive power transfer signal, the resonance circuit having a variable resonance frequency by at least one of the inductive impedance and the capacitive impedance being a variable impedance having an impedance controllable by a control signal; a driver for generating the drive signal for the variable resonance circuit, the drive signal having a variable drive frequency; a frequency modulator for applying a frequency modulation to the drive signal by varying the variable drive frequency in response to data values to be transmitted to the power receiver; and an adapter for generating the control signal in response to the data values such that the variable resonance frequency follows variations in the variable drive frequency resulting from the frequency modulation of the drive signal According to an aspect of the invention there is provided a method of operation for a power transmitter wirelessly providing power to a power receiver via an inductive power transfer signal; the power transmitter comprising a variable resonance circuit generating the inductive power transfer signal in response to a drive signal, the variable resonance circuit comprising a capacitive impedance and an inductive impedance comprising a transmitter coil for generating the inductive power transfer signal, the resonance circuit having a variable resonance frequency by at least one of the inductive impedance and the capacitive impedance being a variable impedance having an impedance controllable by a control signal; the method comprising the power transmitter performing the steps of: generating the drive signal for the variable resonance circuit, the drive signal having a variable drive frequency; applying a frequency modulation to the drive signal by varying the variable drive frequency in response to data values to be transmitted to the power receiver; and generating the control signal in response to the data values such that the variable resonance frequency follows variations in the variable drive frequency resulting from the frequency modulation of the drive signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as that known from the Qi specification. However, it will be appreciated that the invention is not limited to this application but may be applied to many other wireless power transfer systems.

Figure 1:
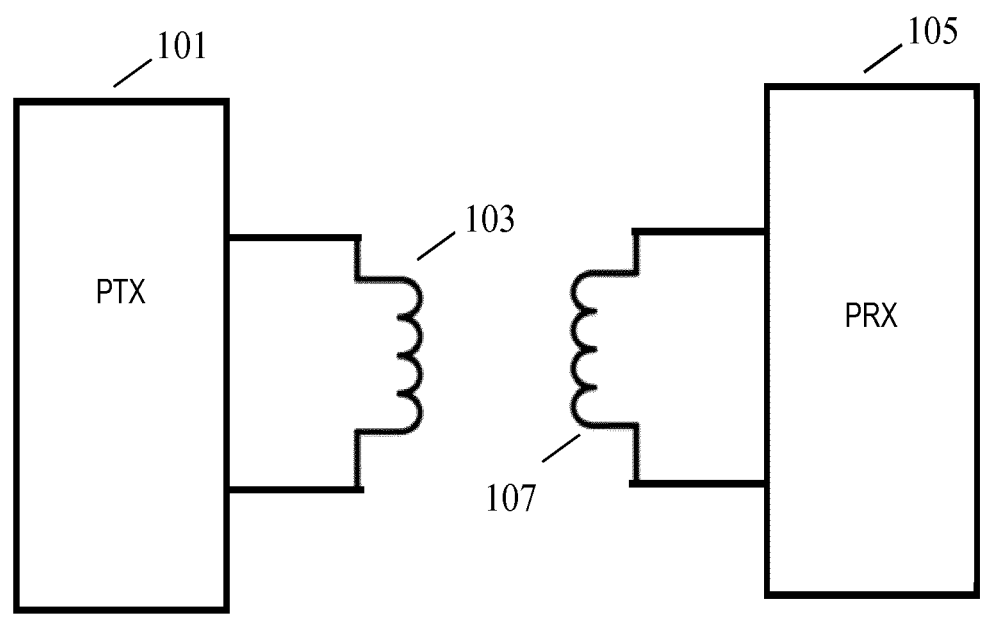
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter inductor/inductor 103. The system further comprises a power receiver 105 which includes (or is coupled to) a receiver coil/inductor 107.

The system provides a wireless inductive power transfer from the power transmitter 101 to the receiver 105. Specifically, the power transmitter 101 generates a wireless inductive power transfer signal (also referred to as a power transfer signal, power signal or an inductive power transfer signal), which is propagated as a magnetic flux by the transmitter inductor 103. The power transfer signal may typically have a frequency between around 20 kHz to around 500 kHz, and often for Qi compatible systems typically in the range from 100 kHz to 200 kHz. The transmitter inductor 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter inductor 103 to the receiver coil 107. The term power transfer signal is mainly used to refer to the inductive signal/magnetic field between the transmitter inductor 103 and the receiver coil 107 (the magnetic flux signal), but it will be appreciated that by equivalence it may also be considered and used as a reference to an electrical signal provided to the transmitter inductor 103 or picked up by the receiver coil 107.

The system is arranged to transfer substantial power levels, and specifically the power transmitter may support power levels in excess of 500 mW, 1 W, 5 W, or 50 W in many embodiments. For example, for Qi corresponding applications, the power transfers may typically be in the 1-5 W power range for low power applications, and in excess of 100 W and up to more than 1000 W for high power applications, such as e.g. kitchen applications.

Figure 2:
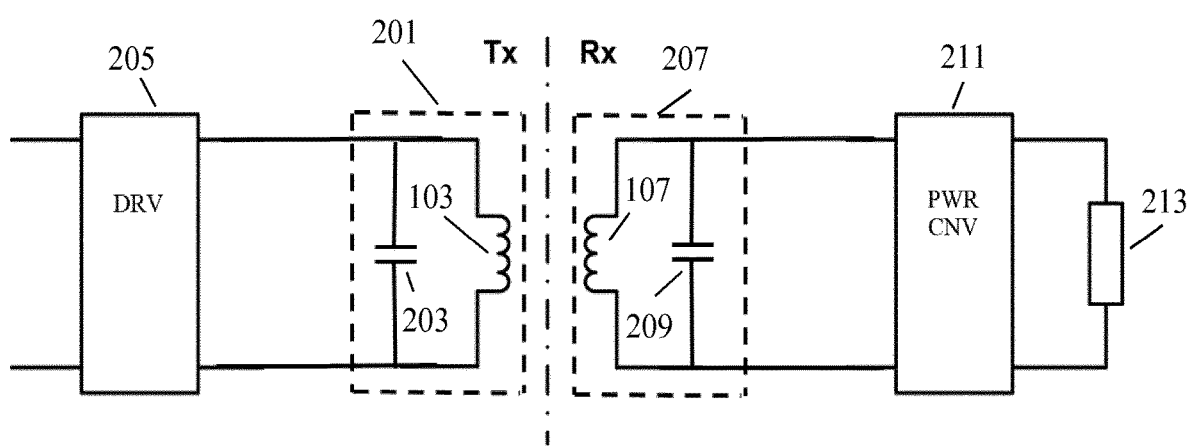
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201. The resonance circuit is formed by an inductive impedance and a capacitive impedance. In the example of FIG. 2, the inductive impedance is formed by a single inductor, namely the transmitter coil 103, and the capacitive impedance is formed by a single transmitter capacitor 203.

The resonance circuit 201 of the power transmitter 101 will also be referred to as the transmitter resonance circuit 201 or the primary resonance circuit 201, and the transmitter coil 103 and transmitter capacitor 203 will also be referred to as the (transmitter) resonating components. The resonance circuit 201 may typically be a serial or parallel resonance circuit, and may in particular as illustrated by FIG. 2 consist of the resonance capacitor 203 coupled in parallel (or in series) to the transmitter inductor 103.

The power transfer signal is generated by driving the transmitter resonance circuit 201 from a driver 205 generating a drive signal with a suitable drive frequency (typically in the 20-200 kHz frequency range).

The input circuit of the power receiver 105 also includes a resonance circuit or resonance tank 207 which includes the receiver inductor 107 and a receiver capacitor 209. The resonance circuit 207 of the power receiver 105 will also be referred to as the receiver resonance circuit 207 or the secondary resonance circuit and the receiver coil 107 and receiver capacitor 209 will also be referred to as the (receiver) resonating components. The receiver resonance circuit 207 may typically be a serial or parallel resonance circuit, and may in particular as shown in FIG. 2 consist of the receiver capacitor 209 coupled in parallel (or series) to the receiver inductor 107.

The receiver resonance circuit 207 is coupled to a power converter 211 which converts the received power transfer signal, i.e. the induced signal provided by the receiver resonance circuit 207, into a power that is provided to an external load 213 (typically by performing AC/DC conversion potentially followed by voltage regulation as will be well known to the skilled person).

The load may for example be a battery and the power provision may be in order to charge the battery. As another example, the load may be a separate device and the power provision may be in order to power this device.

Figure 3:
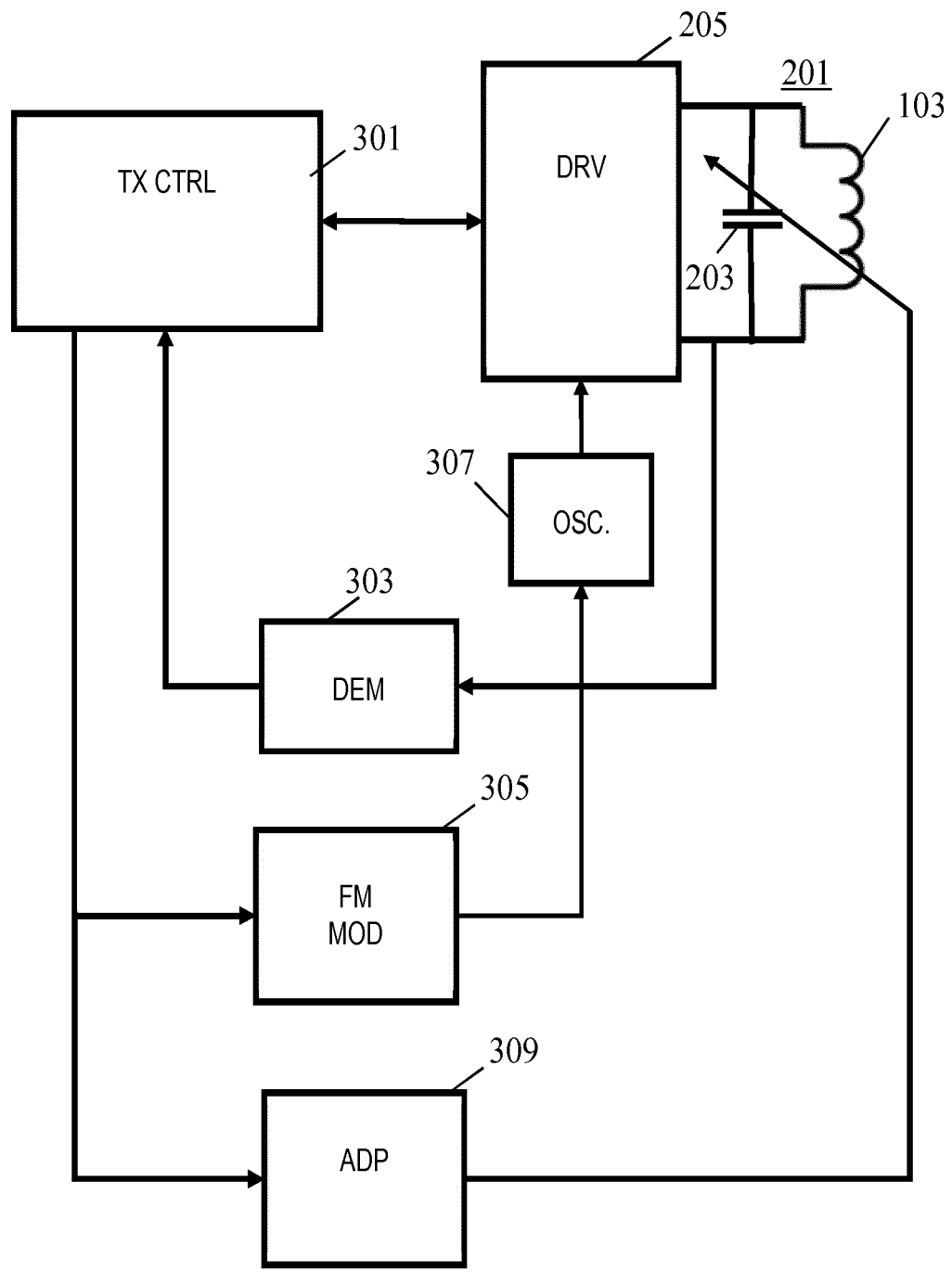
FIG. 3 illustrates an example of elements of a power transmitter in accordance with some embodiments of the invention.

FIG. 3 illustrates some exemplary elements of the power transmitter 101 of FIGS. 1 and 2 in more detail.

FIG. 3 illustrates the driver 205 being coupled to the primary resonance circuit 201 which in the example is shown as comprising the transmit coil 103 and the transmitter capacitor 203.

The driver 205 generates a varying (and typically AC) voltage drive signal which is applied to the transmitter capacitor 203 and transmitter coil 103. In other embodiments, the primary resonance circuit 201 may be a series resonance circuit, and the voltage drive signal may be applied across the capacitor and inductor (thereby also providing a drive signal to the transmitter coil 103). In some embodiments, the driver 205 may be coupled directly (or indirectly) to the transmit coil 103 and the voltage drive signal may be provided to the transmit coil 103. In some embodiments, the drive signal may be a current drive signal. This may in particular be suitable in embodiments wherein the resonance circuit is a parallel resonance circuit whereas a voltage drive signal may often be used for series resonance circuits.

Thus, in the system, the driver 205 generates a drive signal which is fed to the primary resonance circuit 201/transmit coil 103, causing the transmit coil 103 to generate the power transfer signal providing power to the power receiver 105. The driver 205 is arranged to generate the drive signal for the variable resonance circuit 201. The drive signal has a drive frequency.

Figure 4:
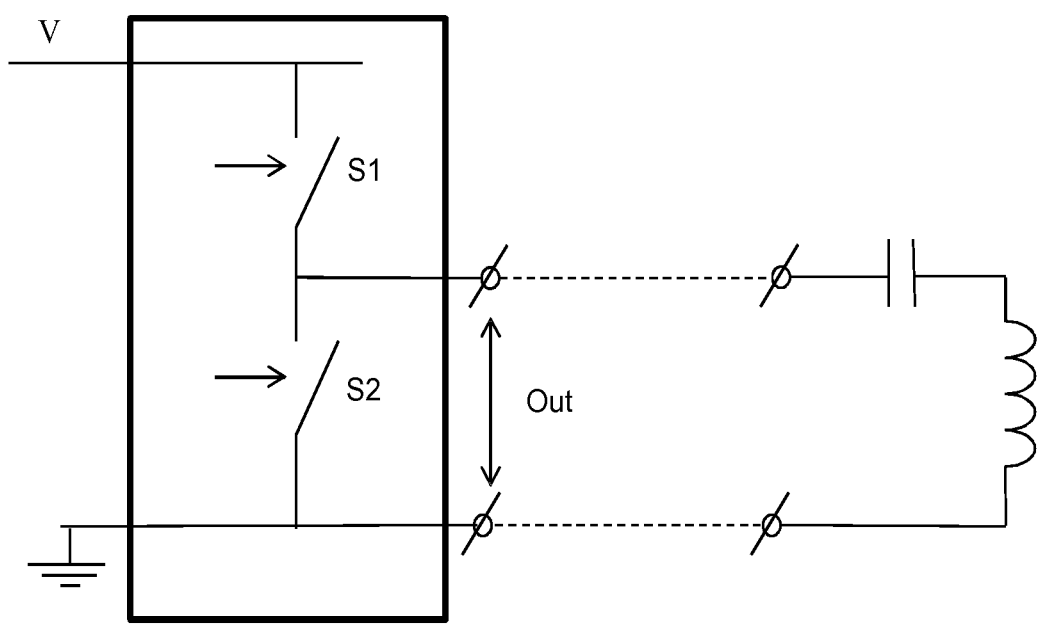
FIG. 4 illustrates an example of elements of a half-bridge inverter for a power transmitter in accordance with some embodiments of the invention.
Figure 5:
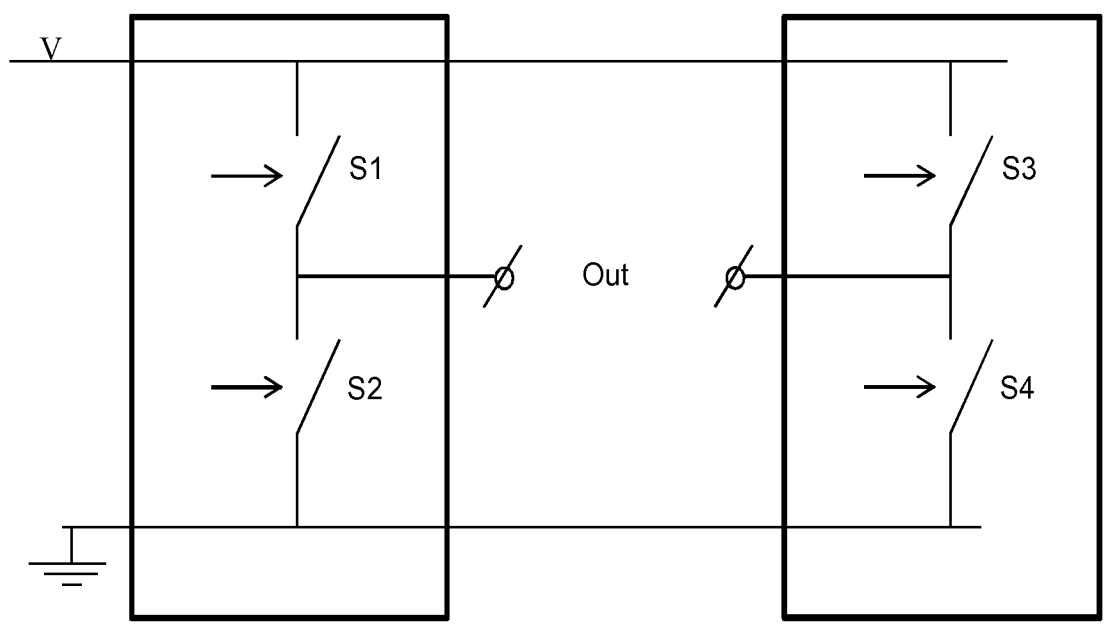
FIG. 5 illustrates an example of elements of a full-bridge inverter for a power transmitter in accordance with some embodiments of the invention.

The driver 205 generates the current and voltage which is fed to the transmitter coil 103/resonance circuit 201. The driver 205 is typically a drive circuit in the form of an inverter which generates an alternating signal from a DC Voltage. The output of the driver 205 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter coil via a resonance capacitor. FIG. 5 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The above description corresponds to the case where the left and right bridge are 180° out of phase and provide the maximum output power or maximum duty cycle. However, in other scenarios, the bridge halves may be partial out of phase. If the bridge halves are in phase resulting in both S2 and S4 or S1 and S3 being closed simultaneously, the bridge voltage will be zero. By controlling the phase between the two bridge halves, the duty cycle of the drive signal and as a result the output power of the drive signal can be controlled.

The driver 205 accordingly generates a drive signal which has a given drive frequency. The drive signal is applied to the primary resonance circuit 201 thereby generating the power transfer signal.

The driver 205 is also coupled to a transmitter controller 301 which comprises control functionality for operating the power transfer function, and which may specifically comprise a controller arranged to operate the power transmitter 101 in accordance with the Qi Specification as appropriate. For example, the transmitter controller 301 may be arranged to control the power transmitter 101 to perform the different Qi phases, including the Identification and Configuration phase and the power transfer phase.

In the example, the power transmitter 101 comprises a single transmitter coil 103 which is driven by the driver 205. Thus, the wireless inductive power signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the driver 205 may be used to generate the wireless inductive power signal. For example, two transmitter coils may be positioned at different positions to provide two charging points for two power receivers. The two coils may be fed the same output signal from the driver 205. This may allow an improved distribution of the wireless inductive power signal/magnetic field in order to support multiple charging points.

The power transmitter 101 further comprises a load modulation receiver in the form of a demodulator 303 which is arranged to receive data messages from the power receiver 105. Specifically, the demodulator 303 is arranged to demodulate load modulation of the wireless inductive power signal to determine the corresponding data transmitted from the power receiver 105. The load modulation receiver/demodulator 303 is thus arranged to demodulate load modulation of the inductive power signal by the power receiver.

On the physical level, the communication channel from the power receiver 105 to the power transmitter 101 is implemented by using the wireless inductive power signal as a communication carrier. The power receiver 105 transmits data messages by modulating the load of the receiver coil 107. The load modulation may e.g. be detected by a change in the amplitude and/or phase of the drive signal current/voltage, by a change in the current/voltage of the transmitter coil 103, and/or a change of current/voltage of a resonance circuit. As another example, the load modulation may be detected by a change in the current of the power supply to the driver 205 (specifically to the inverter/switch bridge).

The power receiver 105 can accordingly load modulate data onto the power signal which the power transmitter 101 can then demodulate. The approach may for example correspond to that described for Qi in "The Qi Wireless Power Transfer System Power Class 0 Specification Parts 1 and 2: Interface Definitions", Version 1.2.1, October 2015 available via http://www.wirelesspowerconsortium.com/downloads/wireless-power-specification-part-1.html, also called the Qi wireless power specification, in particular section 5.3 Power Transmitter to Power Receiver communications interface (or in subsequent versions of the Specification).

In addition to communication from the power receiver 105 to the power transmitter 101, the system of FIGS. 1 and 2 further supports communication from the power transmitter 101 to the power receiver 105. The communication is achieved by frequency modulation of the power transfer signal and the power transmitter 101 specifically comprises a frequency modulator 305 which is arranged to control the driver 205 to generate the drive signal to have a variably drive frequency which depends on the data values that are to be communicated to the power receiver 105. Further information on the use of frequency modulation in Qi systems may be found in section 5.3 Power Transmitter to Power Receiver communications interface of "The Qi Wireless Power Transfer System Power Class 0 Specification Parts 1 and 2: Interface Definitions", Version 1.2.1, October 2015.

Specifically, the power transmitter 101 comprises a frequency modulator 305 which is coupled to the transmitter controller 301 from which it receives data that is to be transmitted to the power receiver 105. The frequency modulator 305 is coupled to a variable oscillator 307 which is further coupled to the driver 205. The variable oscillator 307 controls the drive frequency, and specifically the switch signals for the inverter output bridge are derived from the signal generated by the variable oscillator 307. Thus, the drive frequency will be the same as the frequency of the variable oscillator 307.

The variable oscillator 307 is controlled by the frequency modulator 305 in response to the data to be transmitted and accordingly the drive frequency is by the frequency modulator 305 controlled in response to the data.

It will be appreciated that any suitable approach for implementing or controlling the variable oscillator 307 may be used. For example, the variable oscillator 307 may be an analog oscillator controlled by a voltage dependent capacitor (e.g. implemented by a diode) with the voltage over the capacitor being set by the frequency modulator 305 in response to the data value. In many digital implementations, the variable oscillator 307 may e.g. be implemented as a DDS (Direct Digital Synthesis) unit with a frequency set by a digital input word provided by the frequency modulator 305. As another example, for low drive frequencies, the oscillator output signal may simply be set by a processor dividing a substantially higher clock frequency by a suitable amount. It will also be appreciated that the variable oscillator 307 may be seen as part of the frequency modulator 305 or indeed of the driver 205.

The frequency modulator 305 may accordingly frequency modulate the drive signal and thus the power transfer signal in dependence on the data being transmitted. As a simple example, each possible channel data symbol may be associated with a frequency and the frequency modulator 305 may select the frequency associated with a given data value and transmit the corresponding symbol by setting the drive frequency to this value. For example, a binary value of "0" may be transmitted by transmitting a first frequency $f_1$ and binary value of "1" may be transmitted by transmitting a second frequency $f_2$. However, in most embodiments, each possible data value is associated with a pattern of frequencies.

In the specific example, the drive frequency is thus at a given time selected from a set of frequencies depending on which data value is being communicated (and depending on the timing in the symbol). The set of frequencies is typically limited to a few frequencies, and specifically in many embodiments, the number of possible frequencies is no more than four, and typically no more than two. The set of frequencies is typically predetermined and the selection of frequencies as a function of the data value (and the timing within the data symbol) is typically predetermined.

As an example, the frequency modulation may be achieved using a set of two frequencies ($f_1$, $f_2$). Further, binary communication may be used, and a predetermined link between the different possible data symbols and frequencies may be established. For example, a binary value of "0" may be transmitted by the power transfer signal having a frequency of $f_1$ for the first half of the channel symbol period and a frequency of $f_2$ for the second half of the channel symbol period. A binary value of "1" may be transmitted by the power transfer signal having a frequency of $f_2$ for the first half of the channel symbol period and a frequency of $f_1$ for the second half of the channel symbol period. The frequency modulator 305 may accordingly transmit a binary data value by controlling the drive frequency to reflect a "0" or a "1".

The use of frequency modulation provides a number of advantages in a power transfer system wherein the power transmitter and power receiver are coupled and wherein load modulation is used for communication in one direction. Specifically, it provides a high degree of protection against various forms of amplitude noise.

However, using frequency modulation in a power transfer system also provides some particular challenges that are not present or significantly less problematic e.g. for traditional radio communication.

In particular, frequency modulation results in a changing drive frequency which may affect the power transfer operation and e.g. the efficiency of the power transfer. Further, the frequency variation may result in an often substantial amplitude modulation of the power transfer signal despite the drive signal maintaining a constant amplitude. Such amplitude modulation may result in variations in the induced voltage at the power receiver, and may for example complicate power control operation for the power transfer.

In the system of FIG. 3, a number of problems associated with frequency modulation in a wireless power transfer systems have been mitigated. In particular, in the system of FIG. 3 the resonance circuit 201 is a variable resonance circuit which has a variable resonance frequency. Specifically, the resonance circuit 201 comprises at least one impedance which can be varied in response to a control signal. Specifically, at least one of the capacitive and the inductive impedance of the resonance circuit 201 can be varied in response to a control signal. By varying the impedance, and specifically the reactance of at least one of the (resonating) impedances of the resonance circuit 201, the resonance frequency of the resonance circuit can be varied. For example, as indicated in FIG. 3, the transmitter capacitor 203 may be a variable capacitor which can be varied in response to a control signal (for example, it may be a voltage dependent capacitor which can be modified by changing a DC voltage across the transmitter capacitor 203).

The power transmitter 101 accordingly further comprises an adapter 309 which is arranged to generate the control signal which controls the variable impedance and thus the resonance frequency of the resonance circuit 201. The adapter 309 is coupled to the transmitter controller 301 and/or the frequency modulator 305 and is arranged to generate the control signal in response to the data values (e.g. directly or indirectly since the data values are represented by the drive frequency or oscillator control signal). The adapter 309 accordingly controls the resonance frequency of the resonance circuit 201 in dependence on the data values being transmitted to the power receiver.

Specifically, the adapter 309 is arranged to control the variable impedances such that the resulting resonance frequency follows the variations in the drive frequency which result from the frequency modulation of the drive signal.

This approach may provide substantial benefits for a wireless power transfer system using frequency modulation of the power transfer signal to communicate data to the power receiver. In particular, the approach may reduce amplitude modulation of the power transfer signal caused by the frequency modulation and may lead to both improved communication and improved power transfer.

Indeed, the Inventors have realized that a significant issue in wireless power transfer systems using coupled resonance circuits is that in order to achieve an efficient power transfer, a relatively high Q is required. However, this significantly increases the impact the effect of using frequency modulation of the power transfer signal.

Indeed, when a power transmitter with a high quality resonance circuit is operating with a drive frequency equal or near to the resonance frequency, a change of the drive frequency will lead to a large change of the amplitude of the power signal. Thus, whereas such an approach may be advantageous from the point of view of the power transfer, it also means that frequency modulation, and specifically frequency shift keying, can lead to undesirable and unintended changes in the amplitude of the power signal. The amplitude of the induced voltage at the power receiver may as a result fluctuate too much due to the frequency modulation, leading to potential over- and under-voltage situations. Further, the characteristics of such variations may result in voltage regulation circuitry in the power receiver potentially being affected by such variations resulting in insufficient regulation.

Figure 6:
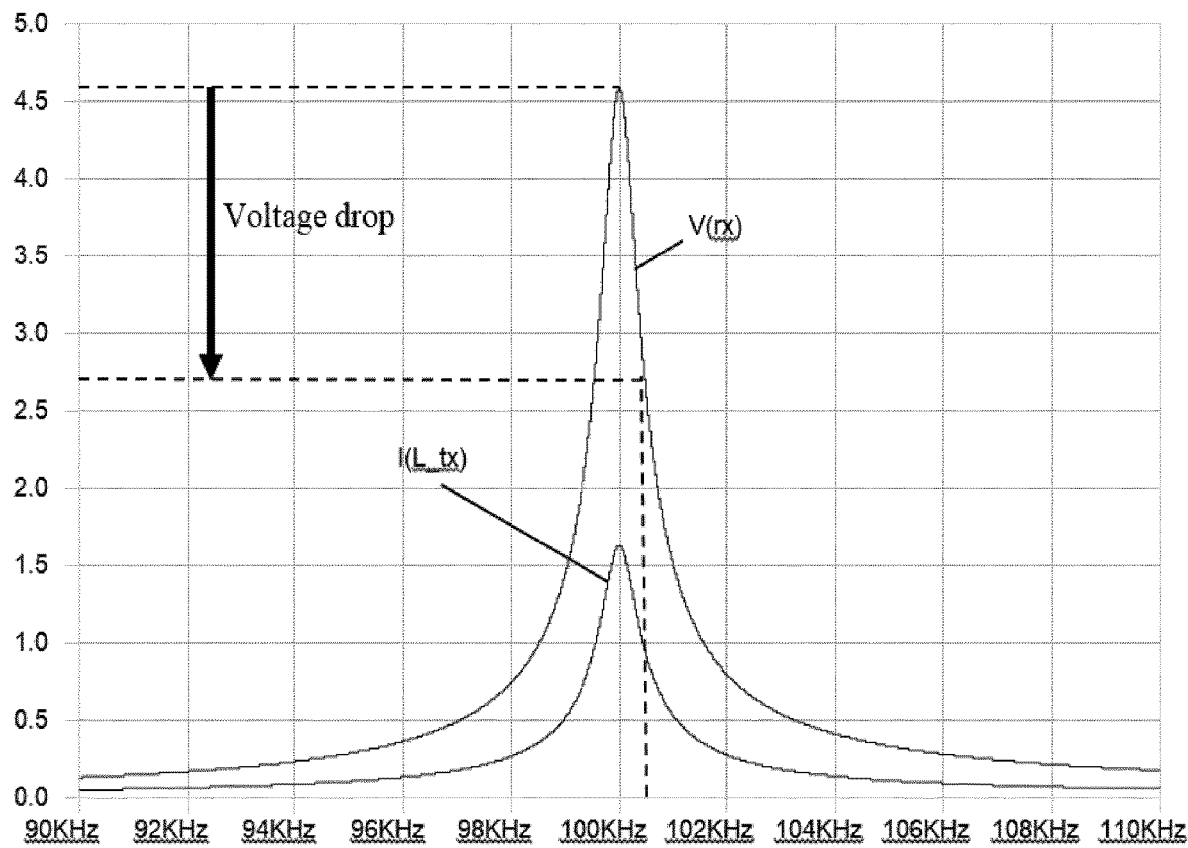
FIG. 6 illustrates an example of signals of a resonance circuit of a power transmitter.

FIG. 6 illustrates the an example of the amplitude of the primary coil current (the current through the transmitter coil 103 I(L_tx)) of the power transmitter and the induced voltage in the power receiver V(rx) as function of the drive frequency for a power transmitter with a high Q factor (Q=150) and a resonance frequency of 100 kHz.

As an example, if the drive frequency and thus the operating frequency of the power transfer signal increases even slightly from 100 kHz to 100.5 kHz due to the frequency modulation, the voltage generated in the receiver V(out) drops significantly. This can also be seen in FIG. 7 which shows the time domain signals for a drive frequency of respectively 100 kHz and 100.5 kHz.

Thus, when operating around the resonance frequency, the frequency modulation used to communicate data can result in an undesired and significant change in the amplitude of the voltage induced at the power receiver. Further, this variation may be too fast to be compensated for by the power control loop, or otherwise may complicate the design for such control loop. However, in the described system, such variation is compensated and mitigated by the resonance frequency of the resonance circuit being modified based on the data value being communicated. Specifically, the resonance frequency is controlled to track the frequency variations in the drive signal. Further, the control is achieved by the power transmitter controlling and modifying the resonance circuit directly based on the data values. This may allow an efficient and low complexity implementation while allowing the power transmitter to be in full control.

Figure 7:
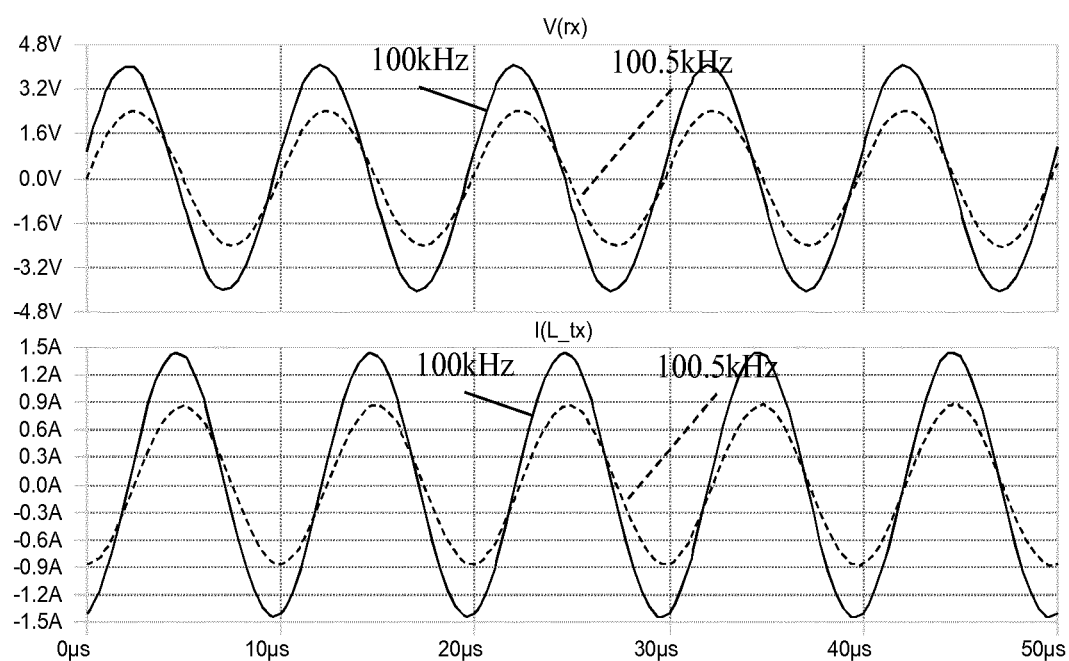
FIG. 7 illustrates an example of signals of a resonance circuit of a power transmitter.
Figure 8:
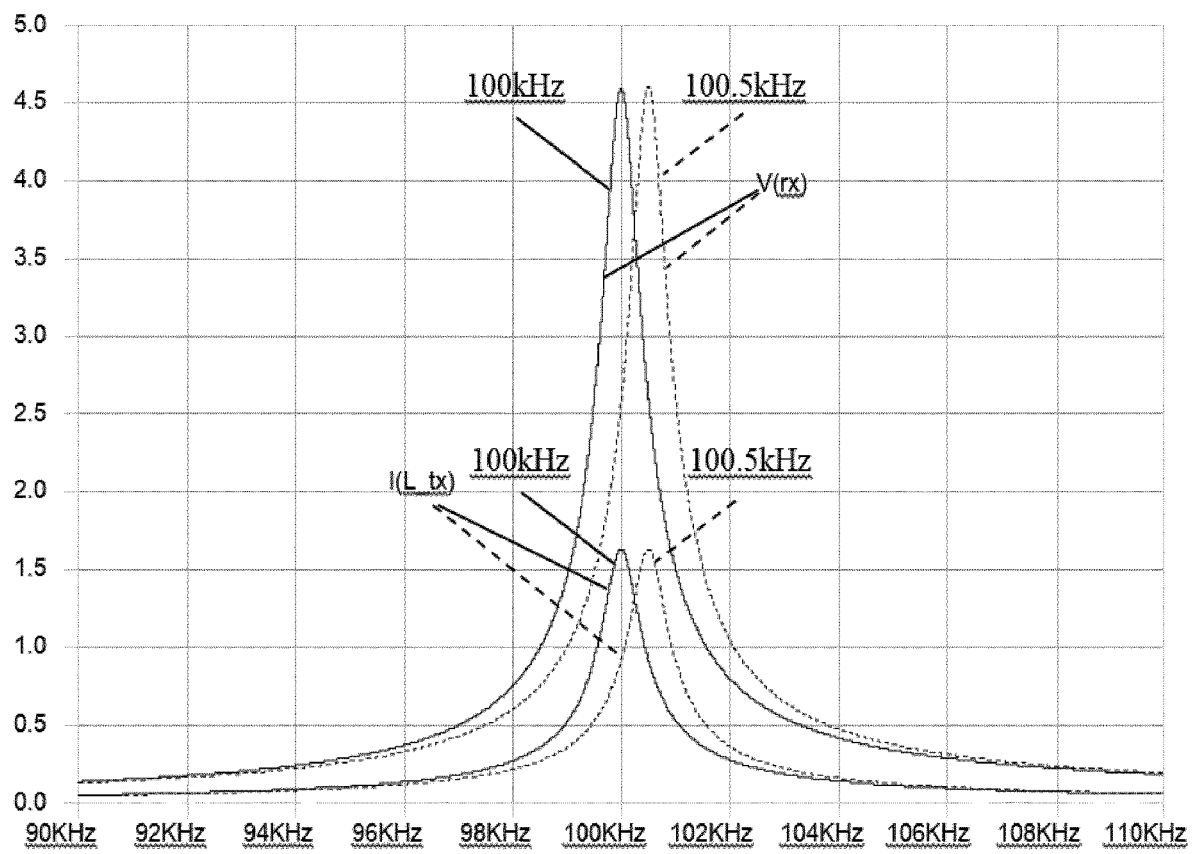
FIG. 8 illustrates an example of signals of a resonance circuit of a power transmitter in accordance with some embodiments of the invention.
Figure 9:
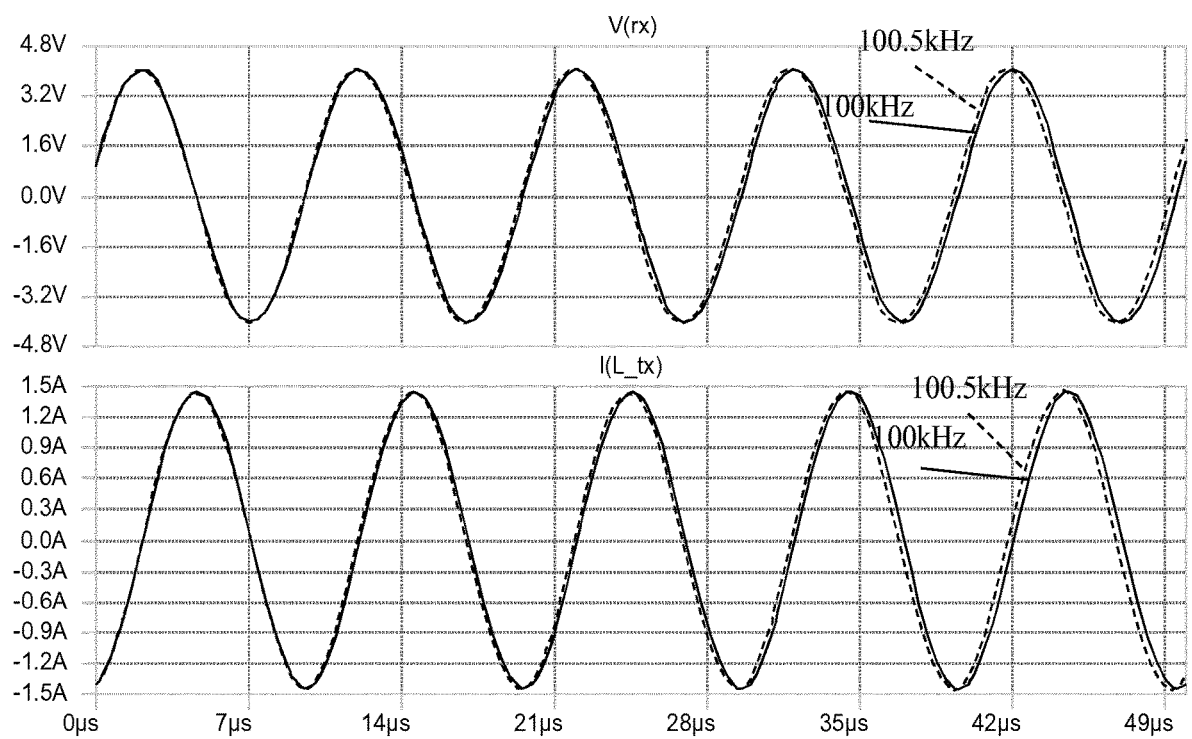
FIG. 9 illustrates an example of signals of a resonance circuit of a power transmitter in accordance with some embodiments of the invention.

The approach can be illustrated by FIGS. 8 and 9 which correspond to FIGS. 6 and 7 but with the difference that the power transmitter controls the resonance circuit to vary the variable impedance such that the resonance frequency follows the changes in the drive frequency due to the frequency modulation. As can be seen, the impact of the frequency modulation can be reduced substantially and indeed may in some scenarios be removed completely.

Thus, in the system, the resonance frequency of the resonance circuit 201 is a variable resonance frequency and the drive frequency is a variable drive frequency. Further, the variable drive frequency varies as a function of the frequency modulation, and the adapter 309 is arranged to vary the variable impedance such that the variable resonance frequency follows the variations in the variable drive frequency. Thus, the control signal is generated such that the variable drive frequency and the variable resonance frequency are substantially the same (within a suitable margin) as the variable drive frequency varies due to the frequency modulation.

It will be appreciated that the exact generation of the control signal will depend on the specific implementation of the resonance circuit and specifically of the variable impedance. In many embodiments, the adapter 309 may generate a binary control signal which changes in synchronization with changes of the drive frequency between two frequencies used for frequency shift keying. The resonance circuit may then switch between two states (e.g. between two different capacitors) depending on the binary value where each state correspond to a resonance frequency equal to one of the frequencies used by the frequency shift keying.

In the system, the variable resonance frequency specifically follows the variable drive frequency such that these match each other. The adapter 309 may generate the control signal such that it causes the variable impedance to vary such that resulting variations in the variable resonance frequency follow variations in the drive frequency resulting from the frequency modulation. The adapter may generate the control signal such that the variable resonance frequency and drive frequency is substantially the same during the frequency modulation/communication of the data values.

Hence, the control signal is arranged to change such that the variations in the variable resonance frequency match the variations in the drive frequency resulting from the frequency modulation In the system, the variable resonance circuit comprises a resonance modification circuit arranged to vary the variable impedance in response to the control signal (e.g. a switch may switch between two states). The adapter 309 and the resonance modification circuit are arranged to vary the resonance frequency to match variations in the drive frequency resulting from the frequency modulation.

Thus, the primary resonance circuit 201 is in the example a variable resonance circuit wherein the resonance frequency can be varied.

It will be appreciated that any suitable approach may be used for changing a variable impedance of the resonance circuit in response to a control signal such that the resonance frequency is modified.

In many embodiments, it may be advantageous for the capacitive impedance to be variable. Specifically, in some embodiments the transmitter capacitor 203 may be a variable capacitor which can be controlled by a control signal generated by the adapter 309.

For example, the capacitor may be a variable capacitor in the form of a varicap or varactor diode. In such an example, the control signal may be generated as a DC voltage which can be overlaid the diode.

However, in many embodiments, the resonance circuit 201 may comprise a switch arranged to short circuit or disconnect one or more capacitors of the capacitive impedance in response to the control signal.

Thus, the transmitter capacitor 203 may for example be implemented by a plurality of parallel capacitors each of which is in series with a switch. For example, a plurality of capacitors with each capacitor approximately having half the capacitance of the previous capacitor may be provided. By switching the individual capacitor in or out, any capacitance up to twice the capacitance of the largest capacitor can be achieved with a resolution corresponding to the capacitance of the smallest capacitor.

In many embodiments, the number of capacitors equals the number of possible data frequencies and the number of switches is one less than the number of possible data frequencies. For example, if only two frequencies are used, the transmitter capacitor 203 comprises one capacitor which is always actively coupled in the circuit, i.e. it is always connected in a resonating configuration with the transmitter coil 103. Further, together with the transmitter coil 103, the first capacitor results in a resonance frequency equal to the highest modulation frequency used by the frequency shift keying. In addition, a second capacitor may be connected in parallel to the first capacitor and with a switch in series. The two capacitors may together have a capacitance that together with the inductance of the transmitter coil 103 results in a resonance frequency equal to the lowest modulation frequency of the frequency shift keying. The control signal may be used to switch the switch between the open and closed configuration, and thus may connect/disconnect or couple/decouple the second capacitor from the transmitter coil 103. Specifically, when the drive frequency is equal to the highest modulation frequency, the control signal sets the switch in an open configuration and when the drive frequency is equal to the lowest modulation frequency, the control signal sets the switch to a closed configuration.

Figure 10:
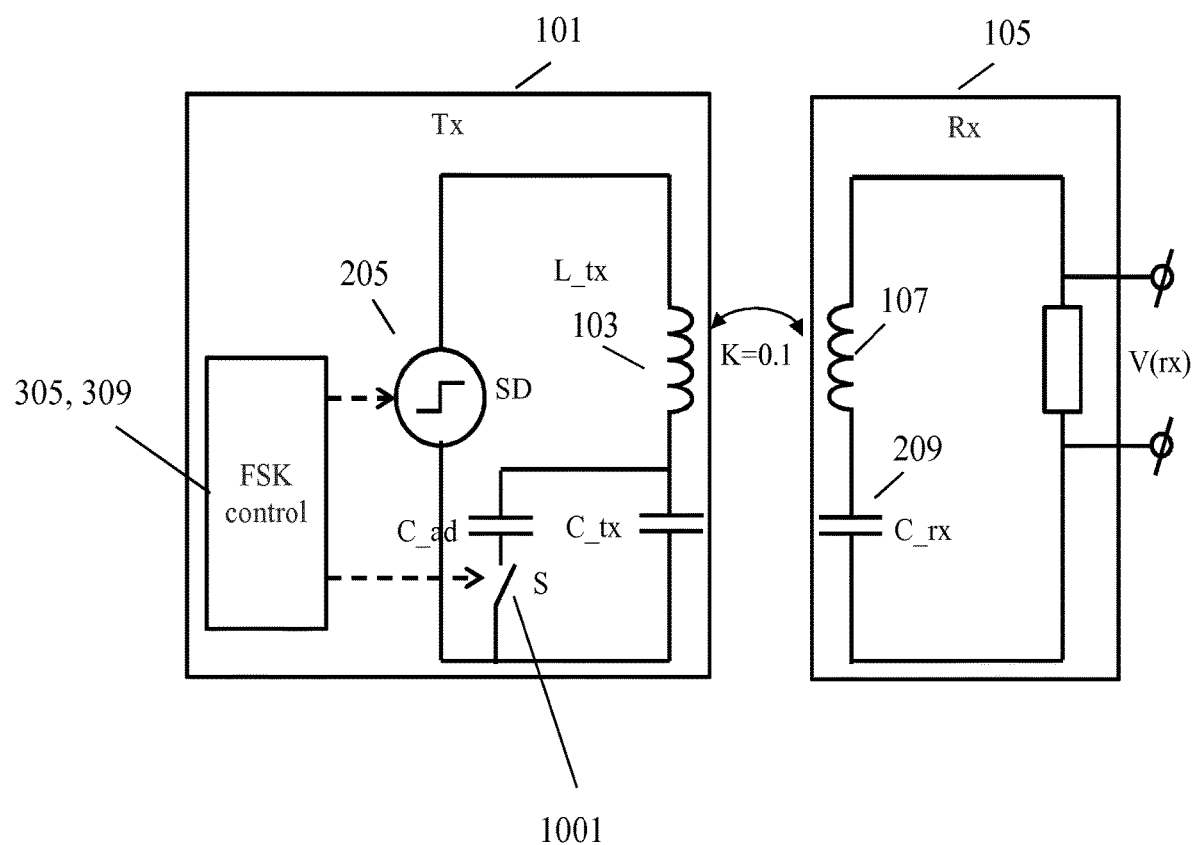
FIG. 10 illustrates an example of elements of a power transfer system in accordance with some embodiments of the invention.

An example of such an approach is illustrated in FIG. 10. In the example, the frequency modulation is achieved by Frequency Shift Keying (FSK) using two frequencies. Thus, the frequency modulator 305 selects the drive frequency from a set of two frequencies. The selection of the frequency may either be for the entire symbol duration or may e.g. be in shorter intervals in accordance with a predetermined pattern for the data value/symbol.

As the frequency modulation uses two frequencies, the transmitter capacitor 203 is formed by two capacitors C_ad and C_tx with one capacitor C_tx continuously being connected in the resonance circuit and the other C_ad being coupled in series with a switch 1001 and with the series connection of the capacitor C_ad and the switch 100 being coupled in parallel to the permanently engaged capacitor C_tx. The switch 1001 can be switched between an open state and a closed state in response to the control signal generated by the frequency modulator 305. The frequency modulator 305 also controls the drive frequency of the driver 205.

In the example, the control signal is a binary control signal which switches the switch 1001 between an open and closed state. When the switch is open, the capacitor C_ad is disconnected from the resonance circuit and the resonance frequency is given only by the values of the transmitter coil 103 (represented by L_tx in FIG. 10) and the capacitor C_tx. The values of these components are selected such that this resonance frequency corresponds to (is substantially the same as) a first of the two drive frequencies of the set of the drive frequencies.

When the switch is closed, the capacitor C_ad is connected in parallel with capacitor C_tx and the two capacitors thus form an effective resonance capacitor with a capacitance equal to the sum of the individual capacitances. The resonance frequency is given by the value of the transmitter coil 103 and this combined capacitor. The value of the capacitor C_ad s is then selected such that this resonance frequency corresponds to (is substantially the same as) a second of the two drive frequencies of the set of the drive frequencies.

Thus, by controlling the binary control signal to open and close the switch 1001, the adapter 309 can control the resonance frequency of the resonance circuit to switch between the frequencies used for the frequency shift keying. The adapter 309 is arranged to generate the control signal to open and close the switch 1001 such that the resonance frequency follows the changes in the drive frequency caused by the frequency modulation. Thus, specifically, when the frequency modulator 305 changes the drive frequency from the first to the second frequency, the adapter 309 generates the control signal to also switch the resonance frequency of the resonance circuit from the first to the second frequency.

Figure 11:
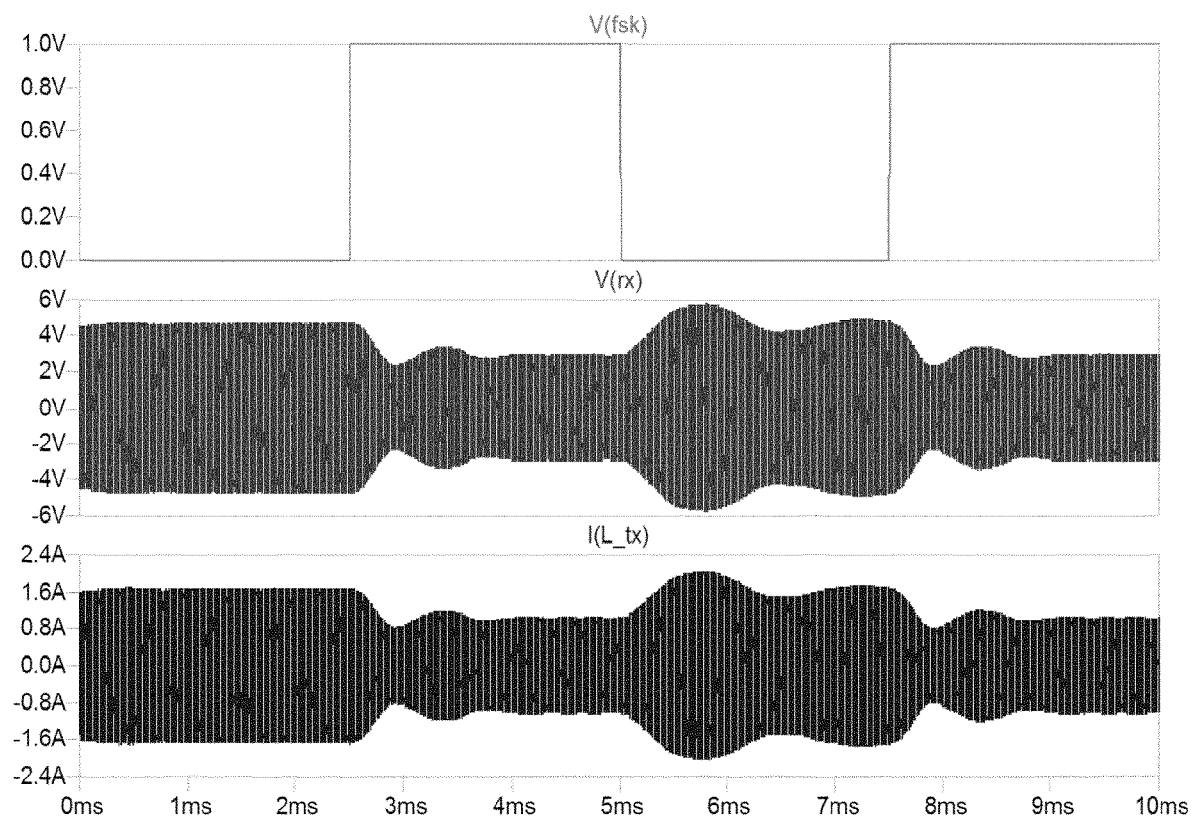
FIG. 11 illustrates an example of signals of a resonance circuit of a power transmitter.
Figure 12:
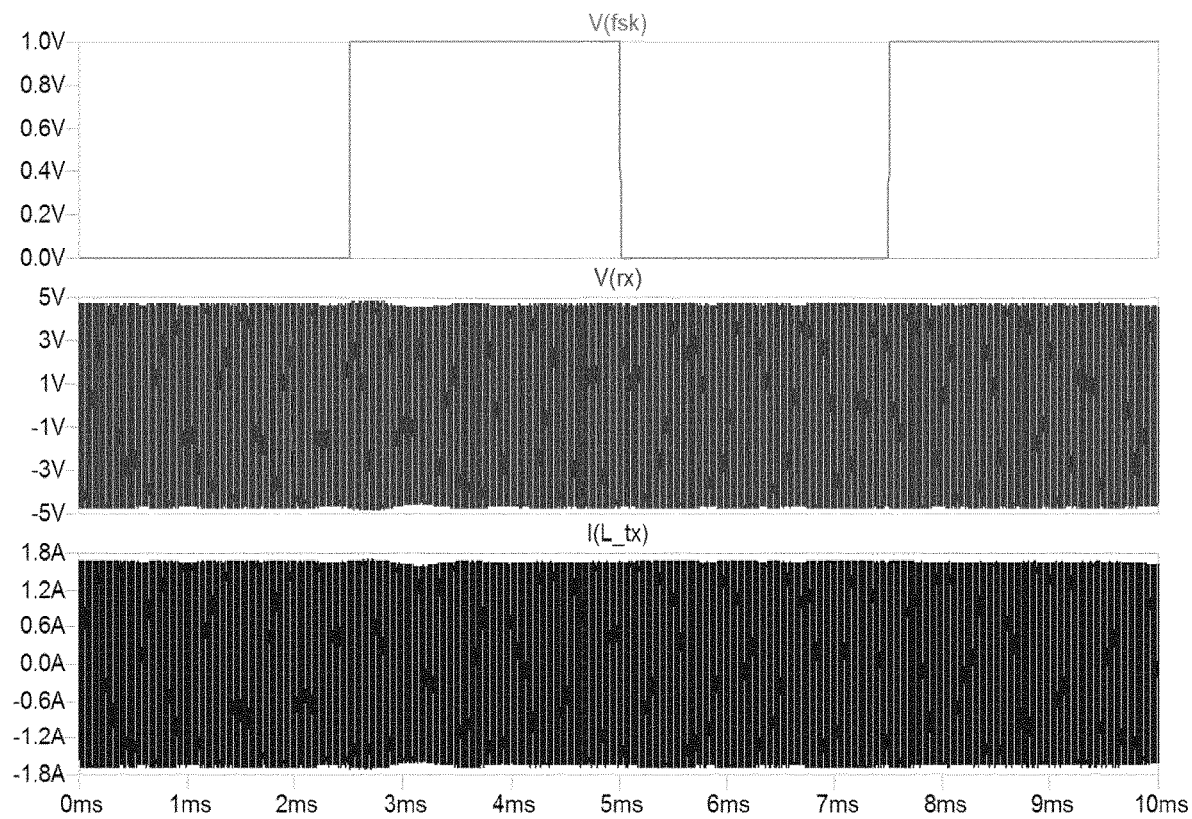
FIG. 12 illustrates an example of signals of a resonance circuit of a power transmitter in accordance with some embodiments of the invention.

This may provide improved performance and in particular may reduce the AM modulation of the voltage induced by the receive coil 107. This may be illustrated in FIGS. 11 and 12. FIG. 11 shows a scenarios wherein the resonance frequency of the resonance circuit is kept constant whereas FIG. 12 shows the result when the resonance frequency is changed as described above (in the example, the two drive frequencies used for FSK are respectively 100 kHz and 100.5 kHz).

As can be seen, the amplitude variation is very substantially reduced thereby reducing the risk of under or overvoltage conditions occurring and facilitating voltage regulation at the receiver end.

In the specific example, the change of the resonance frequency is achieved by synchronizing a control signal to the changes in the drive frequency caused by the frequency modulation. Specifically, the control signal is generated as a switch signal which switches the impedance of one of the resonance impedances synchronously to the changes of the drive frequency by the frequency modulation. As the frequency modulation uses a predetermined FSK pattern of frequency changes, the transitions in the switch control signal can be determined directly from the data symbols by the adapter 309.

It will be appreciated that (as indicated in FIG. 10), the frequency modulator 305 and adapter 309 may be implemented as an integrated functional block and indeed the same control signal may be used to control the frequency modulation (i.e. control the oscillator 307) and the variable impedance of the resonance circuit 201.

In the example, the adaptation of the resonance frequency to follow the drive frequency is achieved by synchronizing the switching in and out of an additional capacitor to the changes in the drive frequency due to the frequency modulation. In other embodiments, it will be appreciated that a plurality of capacitors may be switched in an out, and indeed that this may be done individually for each capacitor (e.g. if more than two different frequencies are used).

It will be appreciated that the control signal may in some embodiments comprise a plurality of subsignals. For example, the control signal may be formed by a plurality of binary control signals each of which control one switch. Indeed, in some embodiments, the control signal may be considered as a multiple bit digital value with each bit being represented by one binary control value/signal.

It will also be appreciated that whereas the previous description focused on parallel impedances being switched in and out, the same principle can be applied to components in series with each other.

Also, whereas the description has focused on switching of capacitors, the approach could also be applied to the inductor impedance. In particular, the equivalence between capacitors in parallel and inductors in series (and vice versa) is noted. However, in many embodiments, it may indeed be advantageous to vary the capacitive impedance. This may in many embodiments reduce the complexity and facilitate switching. In addition, it may reduce the impact of the switching on the generated magnetic field since the transmitter coil 103 is constant.

Specifically, as illustrated in FIG. 10, the resonance frequency may be adapted in response to one or more binary control signals controlling a switch which can short circuit or disconnect (open circuit) a reactive component.

For example, for a switchable capacitor in parallel with another capacitor (which may or may not be switchable), the binary control signal may be arranged to connect or disconnect the switchable capacitor. The switch may specifically be in series with the capacitor and may open to disconnect the switchable capacitor and close to connect the switchable capacitor.

As another example, for a switchable capacitor in series with another capacitor (which may or may not be switchable), the binary control signal may be arranged to connect or short-circuit the switchable capacitor. The switch may specifically be in parallel with the capacitor and may open to connect the switchable capacitor in series with the other capacitor (with the total capacitance accordingly being given by the resulting series capacitance) and close to short-circuit the switchable capacitor (and thus with the total capacitance being given only by the second capacitor).

As another example, for a switchable inductor in parallel with the transmitter coil 103, the binary control signal may be arranged to connect or disconnect the switchable inductor. The switch may specifically be in series with the inductor and may open to disconnect the switchable inductor and close to connect the switchable inductor (resulting in the total resonating inductance being given as the parallel inductance of two inductors).

As another example, for a switchable inductor in series with the transmitter coil 103, the binary control signal may be arranged to connect or short-circuit the switchable inductor. The switch may specifically be in parallel with the inductor and may open to connect the switchable inductor in series with the transmitter coil 103 (with the total inductance accordingly being given by the resulting series inductance) and close to short-circuit the switchable inductor (and thus with the total inductance being given only by the transmitter coil 103).

In the examples given above, the frequency change has furthermore been achieved by connecting or disconnecting (by short circuiting or open circuiting) a reactive component in synchronization with the frequency shift keying. However, it will be appreciated that such a binary "all or nothing" switching is not essential for the approach. Indeed, in some embodiments, the switch may be arranged to limit the current flowing into the reactive component (rather than to prevent it completely). For example, the switch of the previous examples may include a current limiter and switch in parallel (for the series coupling with the reactive component) or may include a current limiter and switch in series (for the parallel coupling with the reactive component).

As described, the adapter 309 is arranged to generate the control signal such that the changes in the resonance frequency are synchronized to the frequency changes resulting from the frequency shift keying. Specifically, the control signal is generated to have transitions synchronized to the transitions of the variable drive frequency between the set of frequencies that are used for frequency shift keying. The changes in the resonance frequency are in this way controlled to be synchronized to the changes in the drive frequency, for example by switches connecting or disconnecting a reactive component of the resonance circuit.

In some embodiments, the control and variation of the drive frequency by the frequency modulator 305 and the generation of the control signal by the adapter 309 are done independently. As the frequency variation (as a function of time) is predetermined for the frequency shift keying, the adapter 309 can in many embodiments estimate the times of the frequency changes sufficiently accurately, and thus can synchronize the control signal to the frequency changes without necessitating a dependent or combined control of these.

However, in many embodiments, the frequency shift keying and the generation of the control signal may not be independent. For example, in some embodiments, the adapter 309 may monitor e.g. the frequency control signal controlling the oscillator 307 and may time the changes in the control signal in response to this. Indeed, in many embodiments, the frequency modulator 305 and adapter 309 may effectively be integrated and the same functionality may be used to generate both the frequency control signal for the oscillator and the control signal for the resonance circuit.

In typical embodiments, the frequency pattern for a (channel) data symbol is given exclusively by the (channel) data symbol and is not dependent on any other (channel) data symbols. Accordingly, the frequency is likely (for most frequency patterns) to change (at least) at the transition between (channel) data symbols. In many embodiments, the adapter 309 is therefore arranged to synchronize transitions in the control signal (corresponding to changes in the resonance frequency of the resonance circuit) to the symbol times for the frequency modulated data.

In some embodiments, each (channel) data symbol is represented by a single frequency with the frequency being dependent on the data value. In such cases, the resonance frequency may only be changed at symbol transition times. In other embodiments, a frequency pattern may be used which also has frequency changes during a (channel) symbol time. In such embodiments, the adapter 309 may additionally control the resonance circuit to change resonance frequency during a symbol time. The transition times within the data symbol are generally predetermined and may in many embodiments be the same for all data values. The timing of such transitions can accordingly be determined by the adapter 309 or be directly derived from the signals generated by the frequency modulator 305.

Thus, in some embodiments, the frequency modulation may be such that it causes frequency transitions during a channel data symbol. In such cases, the adapter 309 may be arranged to generate the control signal to cause transitions in the variable resonance frequency during the channel data symbol. The transitions in the resonance frequency within a data symbol will be synchronized to the times where the frequency changes due to the frequency shift keying pattern for the data symbol.

In many embodiments, the adapter 309 may be arranged to change the resonance frequency both at symbol transition times and at times during the data symbol. In most embodiments, the adapter 309 is arranged to change the resonance frequency whenever the drive frequency changes, and indeed is arranged to change the resonance frequency only when the drive frequency changes due to the frequency shift keying. The adapter 309 in such embodiments thus generates the control signal to cause the resonance frequency to follow the drive frequency, and typically to be substantially the same at substantially all times during frequency modulation. Such an approach may provide a more efficient operation with substantially reduced amplitude modulation resulting from the frequency shift keying.

In the previous examples, the resonance frequency of the resonance circuit is modified by a variable impedance being changed in synchronization with the frequency changes of the drive signal.

In some embodiments, a specific approach may be used wherein it is an effective or average impedance which is being changed in synchronization with the drive frequency changes whereas the actual instantaneous impedance (or reactance) is changed at a higher rate. The effective or average impedance are in some such embodiments changed by changing a duty cycle of the variations in the instantaneous impedance.

Specifically, in some embodiments the resonance circuit may comprise a resonance modification circuit which is arranged to control the variable resonance frequency by slowing a state change for at least one of the capacitive impedance and the inductive impedance for a fractional time interval of at least some cycles of the drive signal. For example, during each cycle of the drive signal, the state change of the transmitter capacitor 203 is frozen for a given time interval by the transmitter capacitor 203 being short circuited following a zero crossing of the voltage over the transmitter capacitor 203.

The resonance modification circuit is arranged to adapt the duration of the fractional time interval in response to the control signal. For example, the resonance modification circuit may be arranged to switch between two different durations, corresponding to two different effective impedance values (and thus two different effective resonance frequencies), in response to the state of a binary control signal.

Figure 13:
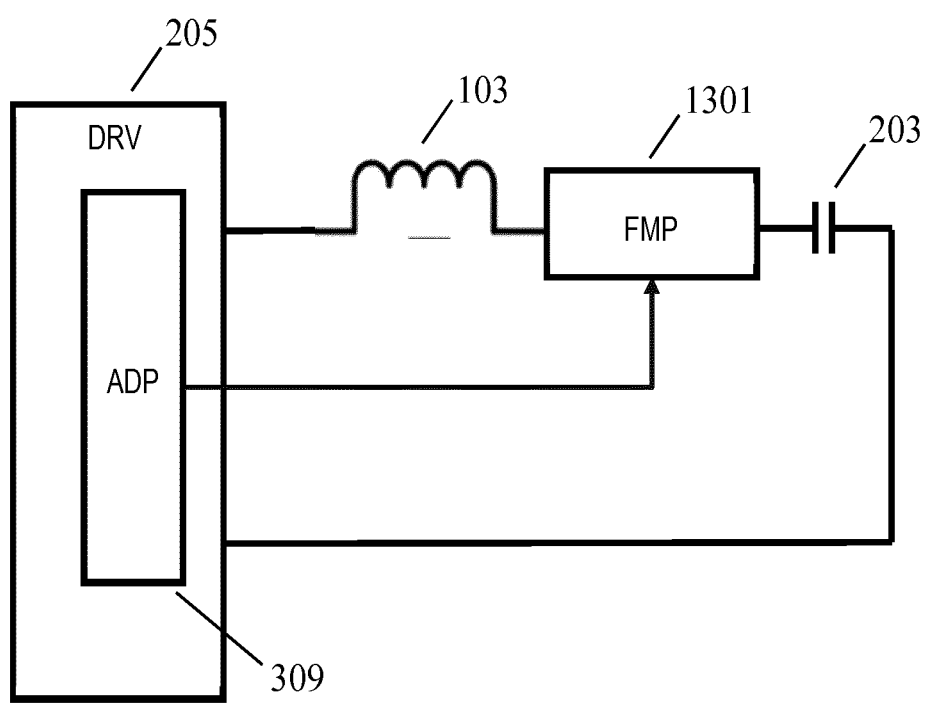
FIG. 13 illustrates an example of elements of a power transmitter in accordance with some embodiments of the invention.

FIG. 13 illustrates elements of an example of the power transmitter 101 wherein the effective resonance frequency can reduced by slowing the state change for a fractional time interval of some, and typically all, cycles of the drive signal.

In the example, the resonance circuit 201 comprises the transmitter coil 103 and the transmitter capacitor 203 but it will be appreciated that the described principles will also be applicable to e.g. more complex impedances (and specifically may be applicable to any resonance circuit using a suitable inductive impedance and capacitive impedance).

Indeed, the transmitter coil 103 of FIG. 13 correspond directly to an inductor generating the power transfer signal but it will be appreciated that in other embodiments the inductive impedance may be considered to be any e.g. one port/two-terminal element which has an at least partial inductive impedance, i.e. which has an inductive reactance component, or in other words which has a complex impedance with a positive imaginary part (and which includes the transmitter coil 103). Thus, the transmitter coil 103 of FIG. 13 may be considered to represent a linear two-terminal circuit or (equivalent) component for which the voltage at the terminals is at least partly dependent on a derivative of the current through the component/circuit.

Similarly, in the specific example, the transmitter capacitor 203 corresponds directly to a single capacitor but it will be appreciated that in other embodiments the transmitter capacitor 203 could more generally be considered to represent any e.g. one port/two-terminal element which has an at least partial capacitive impedance, i.e. which has a capacitive reactance component, or in other words which has a complex impedance with a negative imaginary part. Thus, the transmitter capacitor 203 may be considered to represent a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedances will typically be insignificant, and often negligible, compared to the reactance part. This will ensure that the oscillations are relatively undamped, i.e. it will provide a relatively high Q for the resonance circuit.

For clarity and brevity, the following description will focus on the inductive impedance being an (ideal) transmitter inductor 103, and specifically the transmitter inductor 103 of FIGS. 1 and 2, and the capacitive impedance being an ideal transmitter capacitor 203. For brevity, the pair of the transmitter coil 103 and transmitter capacitor 203 will also be referred to as the resonating components.

The transmitter inductor 103 and transmitter capacitor 203 are coupled together in a resonant configuration. In the example, the transmitter inductor 103 and transmitter capacitor 203 are coupled in series resonance but it will be appreciated that in other embodiments they may be coupled in a parallel resonance configuration.

The transmitter inductor 103 and transmitter capacitor 203 will exhibit a natural resonance frequency corresponding to the resonance frequency of a resonance circuit comprising only the transmitter inductor 103 and the transmitter capacitor 203. As is well known, the resonance frequency for such a circuit is by $1/2\pi\sqrt{LC}$ where L is the inductance of the transmitter inductor 103 and C is the capacitance of the transmitter capacitor 203.

However, in the system of FIG. 13, the resonance circuit 201 further comprises a resonance modification circuit 1301 which is arranged to control the resonance frequency for the transmitter resonance circuit by slowing a state change for the transmitter capacitor 203 and/or the transmitter inductor 103. The resonance modification circuit 1301 can be considered part of the transmitter resonance circuit 201. It will also be appreciated that although the resonance modification circuit 1301 is in FIG. 13 shown as single two terminal element coupled in series between the transmitter inductor 103 and the transmitter capacitor 203, this is merely an example and that other configurations will be used in other embodiments. For example, the resonance modification circuit 1301 in the example of FIG. 13 has only two terminals but it will be appreciated that in other embodiments, the resonance modification circuit 1301 may have more terminals and may be connected to other parts of the circuit, including e.g. to power supply rails for the driver 205.

The resonance modification circuit 1301 is arranged to modify the resonance frequency by slowing a state change for one or both of the transmitter inductor 103 and the transmitter capacitor 203. The state of the transmitter inductor 103 and the transmitter capacitor 203 may be considered to be represented by the current energy values for the component, and specifically may be considered to correspond to the current of the transmitter inductor 103 ($E=\frac{1}{2}LI^2$) and the voltage of the transmitter capacitor 203 ($E=\frac{1}{2}CV^2$).

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 13, the resonance circuit is not allowed to simply perform a free running oscillation but rather the resonance modification circuit 1301 slows down the state change for at least one of the transmitter inductor 103 and the transmitter capacitor 203 during a fractional time interval of some, and typically all of cycles.

The state change is thus slowed during the fractional time interval relative to the state change of a free running resonance circuit comprising only the transmitter capacitor 203 and the transmitter inductor 103.

Specifically, the state change is slowed by impeding the energy flow between the transmitter capacitor 203 and the transmitter inductor 103 (by slowing the energy flow from the transmitter inductor 103 to the transmitter capacitor 203, from the transmitter capacitor 203 to the transmitter inductor 103, or both from the transmitter inductor 103 to the transmitter capacitor 203 and from the transmitter capacitor 203 to the transmitter inductor 103). In a free running resonant circuit, positive current flows from the transmitter inductor 103 to the transmitter capacitor 203 for half of a resonating cycle, and from the transmitter capacitor 203 to the transmitter inductor 103 for the other half of a resonating cycle. In many embodiments, the slowing of the energy flow may be achieved by impeding the current flowing between the resonating components. In many embodiments, the resonance modification circuit 1301 may be arranged to impede current from the transmitter inductor 103 to the transmitter capacitor 203, e.g. by leading (some or all of the) current of the transmitter inductor 103 away from the transmitter capacitor 203 (including potentially leading both negative and positive currents away from the transmitter capacitor 203). In other embodiments, the resonance modification circuit 1301 may be arranged to impede current from the transmitter capacitor 203 to the transmitter inductor 103, e.g. by disconnecting the transmitter capacitor 203 from the transmitter inductor 103 during the fractional time interval (thereby also setting the voltage across the inductor to zero, i.e. both the current and the voltage is set to zero for the inductor).

In these examples, the current flow between the resonating components is thus reduced or even prevented completely during the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration.

The resonance modification circuit 1301 may in this way control and adjust the effective resonance frequency to be lower than the natural resonance frequency. The actual effective resonance frequency is in the system of FIG. 13 controlled by the resonance modification circuit 1301 being capable of varying the duration of the fractional time interval. Thus, the longer the fractional time interval is, the larger the effect of slowing the state change will be, and thus the lower will be the effective resonance frequency.

In the example, the resonance modification circuit 1301 is arranged to vary the duration of the fractional time interval in response to the control signal and thus is arranged to vary the variable impedance and thus the resonance frequency of the resonance circuit 201 in response to the control signal. For example, the resonance modification circuit 505 may be arranged to switch between two predetermined durations in response to the state of a binary control signal. The two durations may be selected to result in an effective resonance frequency corresponding to two frequencies used for frequency shift keying.

Figure 14:
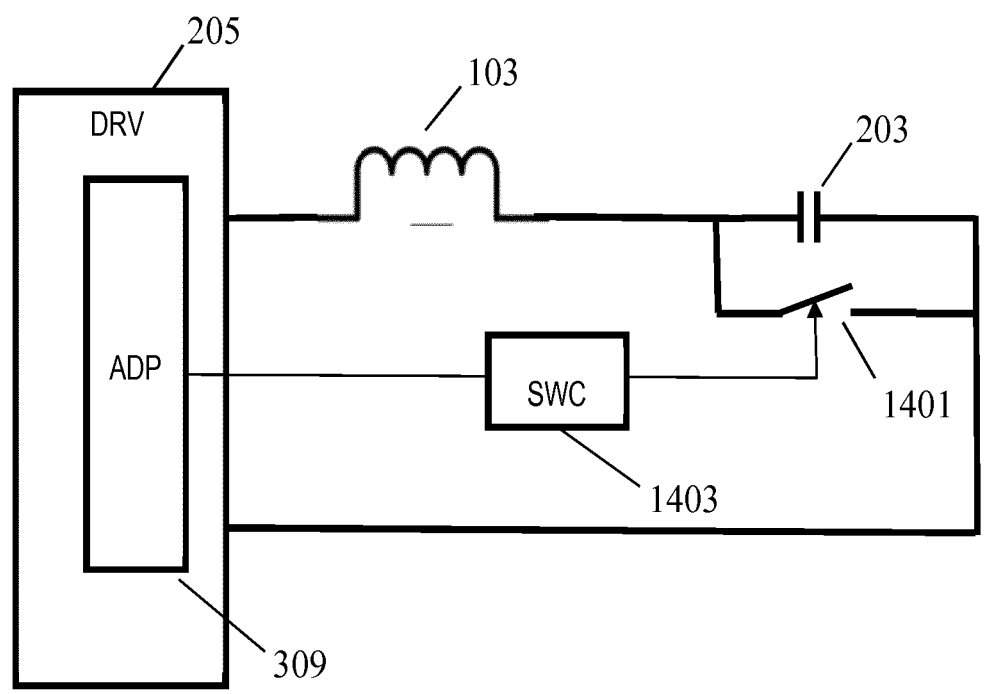
FIG. 14 illustrates an example of elements of a power transmitter in accordance with some embodiments of the invention.

FIG. 14 illustrates an example of the approach of FIG. 13 wherein the resonance modification circuit 1301 is arranged to slow the state change of the transmitter capacitor 203. In the example, the resonance modification circuit 1301 is arranged to divert current from the transmitter inductor 103 away from the transmitter capacitor 203 during the fractional time interval. The diversion is achieved by a switch 1401 which is coupled in parallel with the transmitter capacitor 203 and which is arranged to short-circuit this.

In the example, the switch 1401 is closed during the fractional time interval. The opening and the closing of the switch 1401 is in the specific example controlled by the transitions of a switch signal generated by a switch controller 1403 in response to the control signal received by the adapter 309.

Specifically, the switch controller 1403 may be arranged to generate a switch signal which in each cycle of the drive signal short-circuits the transmitter capacitor 203 for a given duration (the fractional time interval) and with the duration depending on the control signal. For example, the switch controller 1403 may apply one of two predetermined durations depending on the control signal where the two durations correspond to resonance frequencies equal to two frequencies used for the frequency shift keying.

When the switch 1401 is closed, the current that is flowing through the transmitter inductor 103, and which would otherwise charge or discharge the transmitter capacitor 203, is instead diverted through the switch 1401. Thus, by short circuiting the transmitter capacitor 203, the current bypasses the transmitter capacitor 203 and accordingly does not charge the capacitor. In the example, the switch 1401 is arranged to close at a time instant corresponding to the voltage across the transmitter capacitor 203 being zero. At this time, there is substantial current through the transmitter inductor 103 (indeed the current will be at the maximum level). However, by short-circuiting the switch, this current is no longer flowing through the transmitter capacitor 203 but will instead flow through the switch 1401. Accordingly, the short circuit of the transmitter capacitor 203 ensures that the voltage is maintained at zero, i.e. the state of the transmitter capacitor 203 is kept constant.

It should be noted that the switch 1401 accordingly forms a current diversion path which may divert both positive and negative current from the transmitter capacitor 203.

After a certain duration, i.e. at the end of the fractional time interval, the switch is opened again thereby resulting in the current flowing through the transmitter coil 103 now flowing into (or out of) the transmitter capacitor 203. As a result, the transmitter capacitor 203 starts charging and the capacitor voltage changes accordingly. This will result in the effective capacitance of the transmitter capacitor 203 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)} * t2}{C1}.$$

Considering instead another capacitor C2 with a smaller value than C1 but being short circuited from 0 to t1 and charged in the time interval from t1 to t2, this capacitor is charged with the same average current $\overline{i(t)}$ to voltage U1(t2). For C2 the voltage can be determined as:

$$U2(t2) = \frac{1}{C2}\int_0^{t2} \overline{i(t)}dt = \frac{1}{C2}\int_0^{t1} 0 dt + \frac{1}{C2}\int_{t1}^{t2} \overline{i(t)}dt \rightarrow U2(t2) = \frac{\overline{i(t)} * (t2-t1)}{C2}$$

If U1(t2) and U2 (t2) are equal at t2, then C1 can be expressed by:

$$C1 = \frac{t2}{t2-t1} * C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor. Hence, by varying the duration of the short circuit, the effective capacitance is varied.

Figure 15:
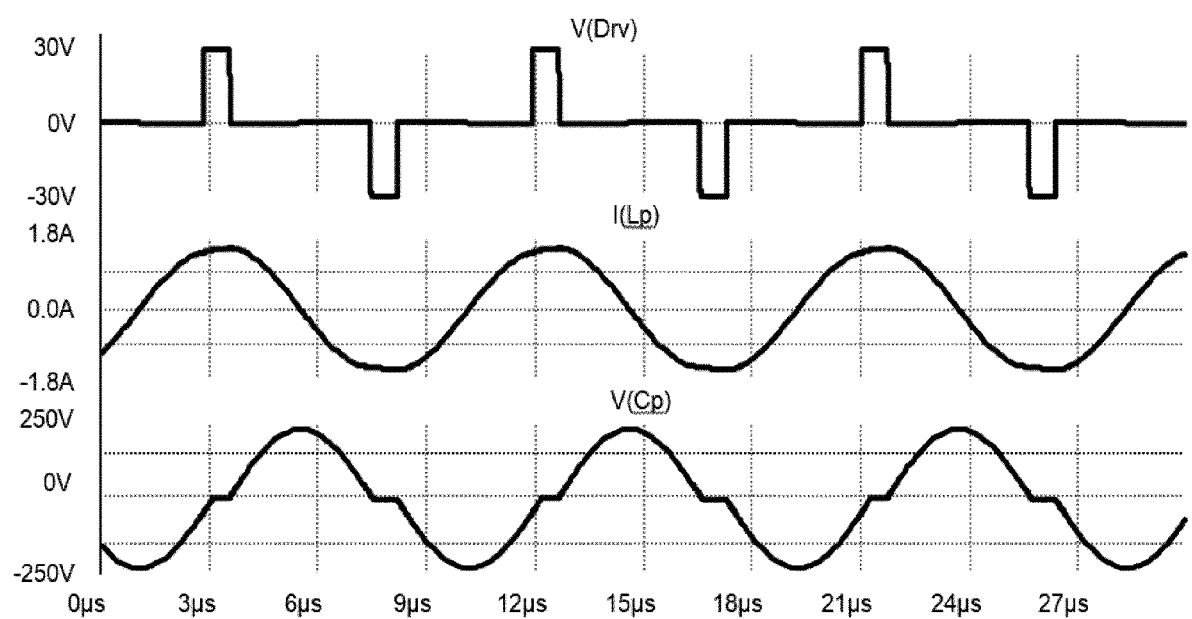
FIG. 15 illustrates an example of signals of a resonance circuit of a power transmitter in accordance with some embodiments of the invention.

An example of the signals in the circuit of FIG. 14 is provided in FIG. 15. In the example, the inductance of the transmitter inductor 103 is Lp=200 uH and that capacitance of the transmitter capacitor 203 is Cp=8.2 nF resulting in natural resonance frequency of:

$$fp = \frac{1}{2\pi * \sqrt{Lp * Cp}} = 125 \text{ kHz}.$$

In the example, the upper curve shows the drive signal, the middle curve shows the current through the transmitter coil 103, and the lower curve shows the voltage over the transmitter capacitor 203.

As can be seen, for each cycle, the switch 1401 is arranged to short circuit the transmitter capacitor 203 during a first fractional time interval (for a positive zero crossing of the capacitor voltage) and during a second fractional time interval (for a negative zero crossing of the capacitor voltage). In each fractional time interval, the voltage is thus kept constant for approximately 1 μs. During this time, the voltage of the transmitter capacitor 203 does not change. Similarly, the current through the transmitter inductor 103 hardly change either (it is almost constant at the maximum value) due to the transmitter inductor 103 not being exposed to a voltage.

As can be seen, the effective resonance frequency is lowered, and indeed in the example, an effective resonance frequency of around 102 kHz is achieved.

The exact effective resonance frequency can be set by adjusting the duration of the fractional time intervals. The longer the duration, the lower the frequency. In the approach, the duration of the fractional time interval is accordingly varied in dependence on the control signal.

Figure 16:
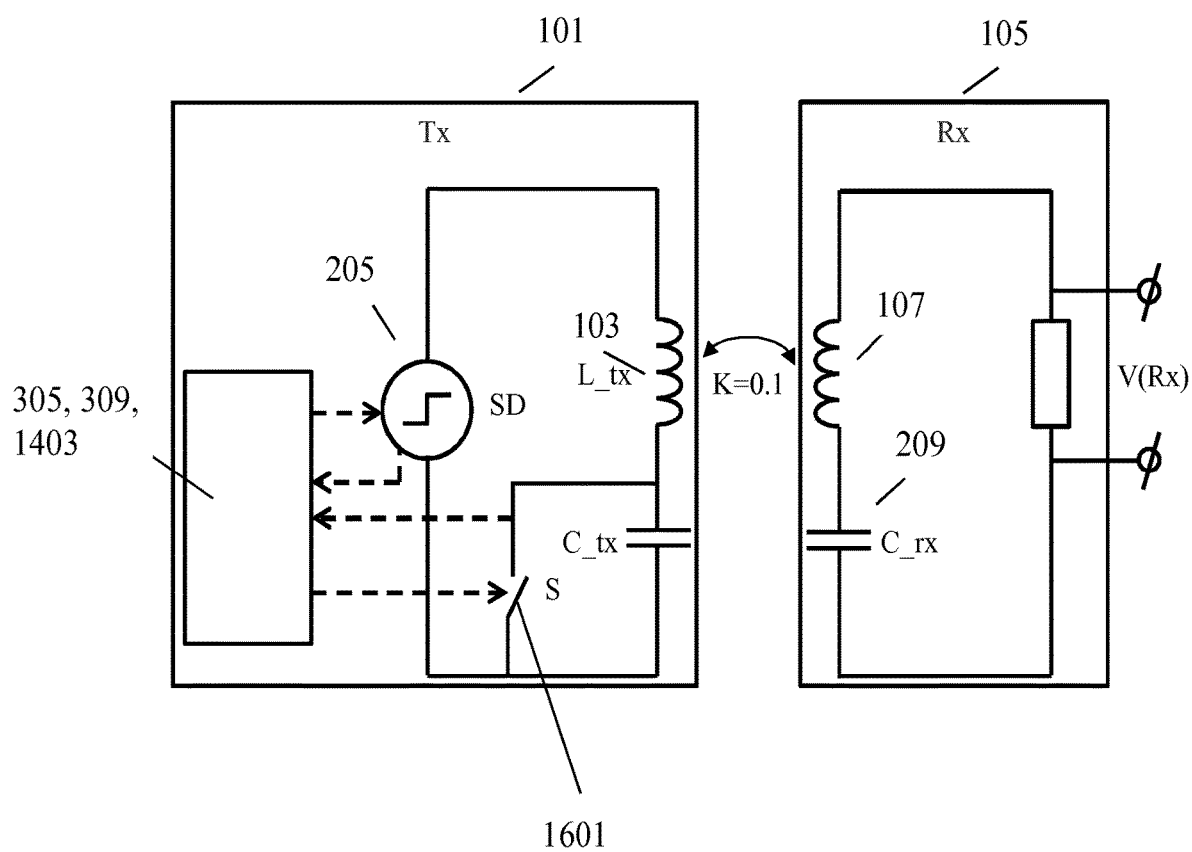
FIG. 16 illustrates an example of elements of a power transfer system in accordance with some embodiments of the invention.

Another example, corresponding to the example of FIG. 10, is provided in FIG. 16. In the example, the switch controller 1403 is further combined with the driver 203 and the adapter 309 in a combined unit.

In the example, the combined unit switches a bypass switch 1601 to C_tx (the transmitter capacitor 203) synchronously with the driving signal. When the voltage over the transmitter capacitor 203 is at zero voltage, the combined unit closes the switch to keep the voltage over the capacitor at zero, while the current through L_tx keeps flowing via the bypass switch 1601. The combined unit opens the switch after a time Thold. When the combined unit changes the frequency of the drive signal in accordance with the frequency shift keying, it also adapts the timing of bypass switch 1601. In the example, the value of the transmitter capacitor 203 (C_tx) is chosen such that the power transmitter resonates at 105 kHz if the bypas switch 1601 is always open. If the driving frequency is 100 kHz, the combined unit uses a Thold of 500 ns; if the driving frequency is 100.5 kHz the FSK control unit applies a Thold of 450 ns. Thus, by changing the duration of the fractional time interval in which the bypass capacitor 1601 is closed, the effective capacitive impedance and thus the effective resonance frequency of the resonance circuit can be changed to match the drive signal frequency as this changes due to the frequency modulation.

Figure 17:
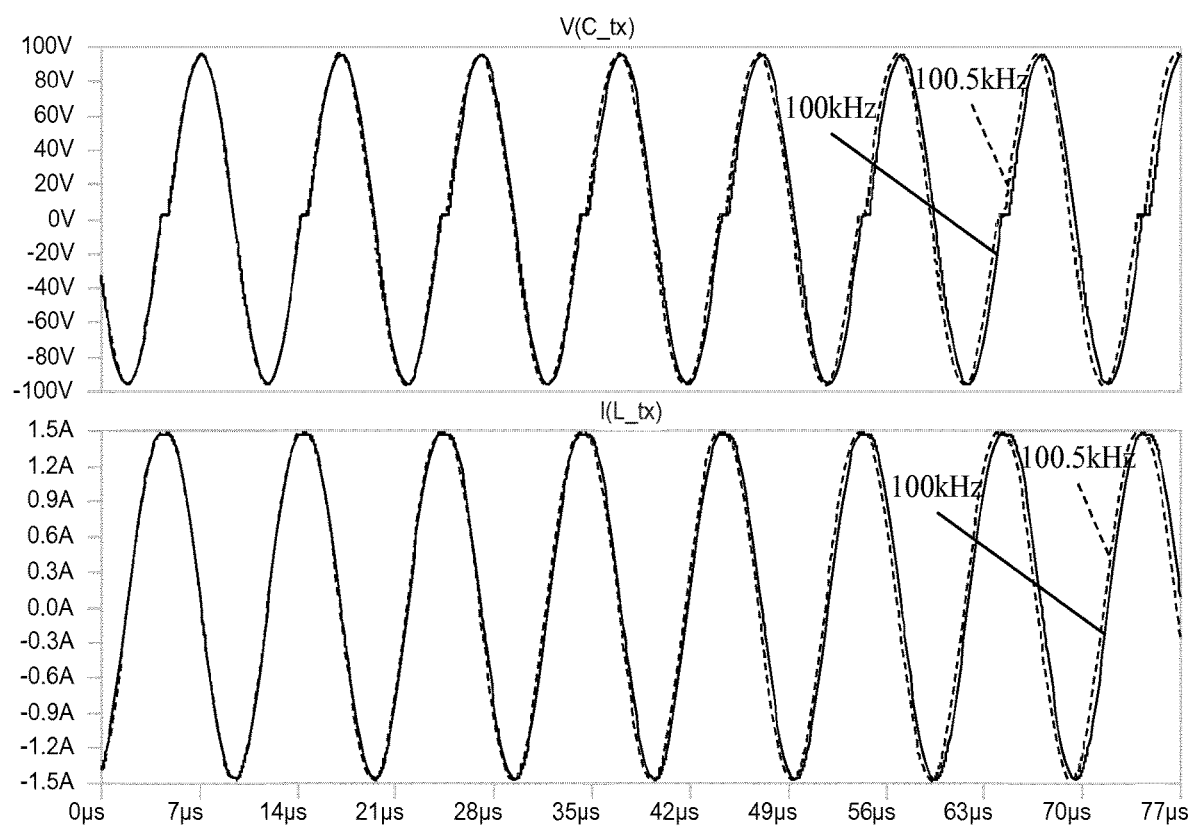
FIG. 17 illustrates an example of signals of a resonance circuit of a power transmitter in accordance with some embodiments of the invention.
Figure 18:
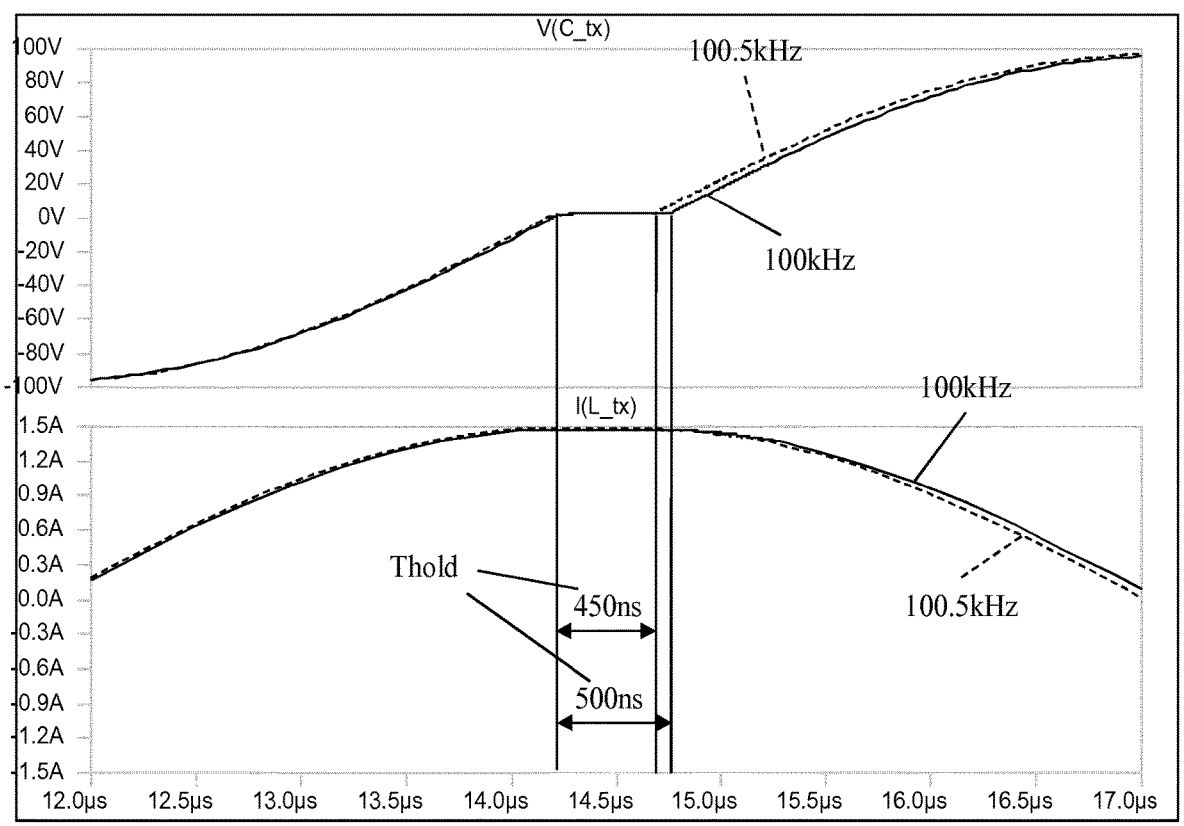
FIG. 18 illustrates an example of signals of a resonance circuit of a power transmitter in accordance with some embodiments of the invention.

FIG. 17 illustrates the voltage over transmitter capacitor 203 and the current through the transmitter coil 103 for the two different drive frequencies, i.e. for a driving frequency of 100 kHz and 100.5 kHz respectively. FIG. 18 illustrates these values for a smaller time interval around the fractional time interval (i.e. with the time axis expanded).

In the example, the resonance modification circuit may thus determine the start time of the fractional time interval in response to a signal of the resonance circuit, such as specifically it may determine the start time to coincide with a zero crossing of the voltage over the transmitter capacitor 203. This may provide a particularly advantageous time for short-circuiting the capacitor as it can reduce or avoid transients and step changes. Further, the end time is determined in response to the control signal, i.e. the duration of the fractional time interval is controlled by controlling the time Thold at which the bypass switch is shifted to the open state thereby allowing the transmitter capacitor 203 to charge.

It will be appreciated that in other embodiments, other times or events of the cycle could be used, and that e.g. the current or voltage of the transmitter coil 103 could be used to determine one of the start and end times with the other being controlled in response to the control signal (and thus being varied to vary the effective resonance frequency).

In some embodiments, the combined unit may measure the voltage e.g. over the transmitter capacitor 203 and generate the switch signal in response to e.g. a detection of a zero crossing. In other embodiments, a bypass switch arrangement may be used which automatically open and/or closes the switch at the appropriate time.

For example, instead of the single bypass switch 1601 of FIG. 16, an arrangement comprising a diode in series with a switch may be used. In such an example, the switch may e.g. be opened at some time during which the voltage over the transmitter capacitor 203 is negative. As the diode voltage is accordingly also negative, the diode will not conduct until the voltage over the transmitter capacitor 203 turns positive (and exceeds the diode conduction voltage). At this stage, the diode will start to conduct the current. Thus, the voltage over the transmitter capacitor 203 is frozen at the diode conduction voltage and as this is relatively low (typically around 0.5V), the effect is substantially that the transmitter capacitor 203 is bypassed at approximately the zero crossing of the capacitor voltage. After a desired duration, the switch may then be switched to the open state by the combined unit thereby allowing the transmitter capacitor 203 to be charged. This may facilitate control of the transmitter communication inductor 209, and specifically may facilitate the generation of the switch signal controlling the switch as only one transition needs to be accurately timed to achieve a given desired duration of the fractional time interval.

The previous text has focused on the example where the resonance modification circuit 1301 is arranged to slow the state change for the transmitter capacitor 203 (and more generally the capacitive impedance) by diverting current from the transmitter coil 103 (more generally the inductive impedance) away from the transmitter capacitor 203 during the fractional time intervals. However, in other embodiments, the resonance modification circuit 1301 may be arranged to slow the state change for the transmitter coil 103 by blocking current flow from the transmitter capacitor 203 to the transmitter coil 103 during the fractional time interval.

Figure 19:
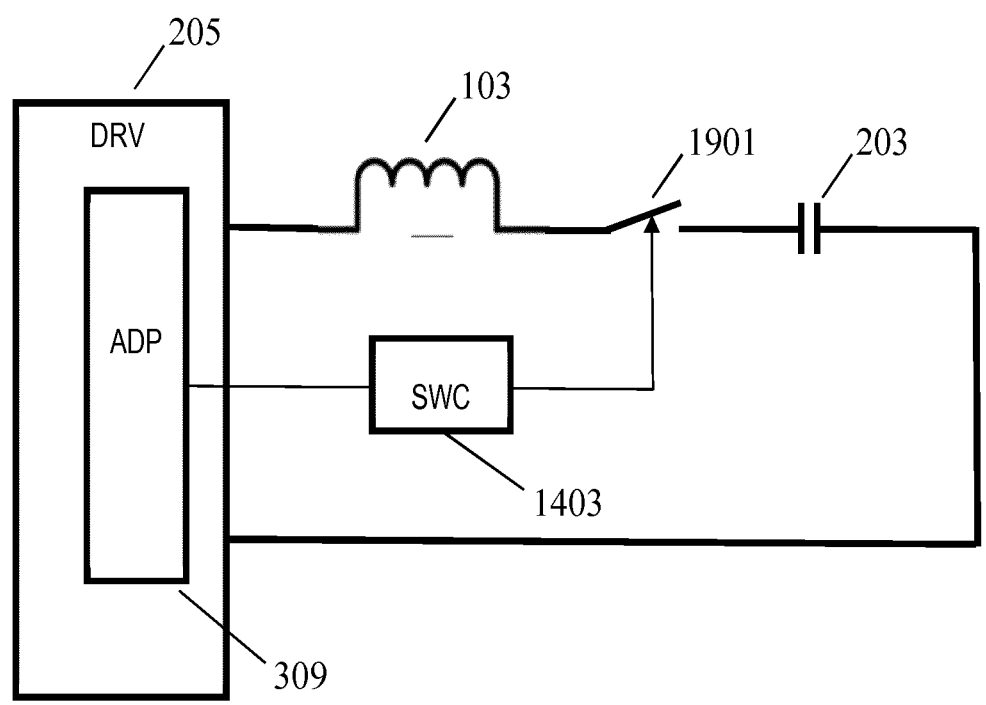
FIG. 19 illustrates an example of elements of a power transfer system in accordance with some embodiments of the invention.

For example, FIG. 19 illustrates an example wherein the resonance modification circuit 1301 is arranged to slow the state change for the transmitter coil 103 by impeding current flow (and specifically the rate of change of the current flow) from the transmitter capacitor 203 to the transmitter coil 103 during the fractional time interval, or equivalently by reducing the voltage imposed by the transmitter capacitor 203 over the transmitter coil 103. Specifically, in the example, the resonance modification circuit 1301 is arranged to slow the state change for the transmitter coil 103 by blocking current flow from the transmitter capacitor 203 to the transmitter coil 103 during the fractional time interval, or equivalently by setting the inductor voltage to zero.

In the example, the current from the transmitter capacitor 203 to the transmitter inductor 103 is blocked by a switch 1901 which is in series with the transmitter inductor 103. In the example, the driver 205 is arranged to effectively disconnect the coupling between the transmitter capacitor 203 and the transmitter inductor 103 for part of resonance cycle. The operation corresponds to that described for FIG. 14. Indeed, in example of FIG. 14, the switch 1401 is arranged to freeze the voltage across the transmitter capacitor 203 at zero by controlling the current through the transmitter capacitor 203 to be zero. In the example of FIG. 19, the switch 1901 is arranged to freeze the current through the transmitter inductor 103 at zero by disconnecting the transmitter inductor 103 from the transmitter capacitor 203 and so removing the influence of the voltage of the transmitter capacitor 203 on the transmitter coil 103. Thus, the two approaches are equivalent with the consideration that operation of a capacitor and inductor are the same when the roles of current and voltage are swapped. Indeed, the signals of FIG. 15 could also apply to the example of FIG. 19 if the curves for inductor current and capacitor voltage are swapped with respectively capacitor voltage and inductor current.

It should also be noted that in the provided examples, the state change of both the transmitter capacitor 203 and the transmitter inductor 103 are slowed, or substantially frozen, during the fractional time interval. Indeed, in the example of FIG. 14, during the fractional time interval, no current reaches the transmitter capacitor 203 and the voltage is constant at zero. However, this also freezes the voltage across the transmitter inductor 103 to remain constant and thus the inductor current is substantially constant, i.e. there is substantially no state change for the transmitter inductor 103. Similarly, in the example of FIG. 19, during the fractional time interval, no current can flow from the transmitter capacitor 203 and accordingly the voltage across the transmitter capacitor 203 will be substantially constant, i.e. there is substantially no state change for the transmitter capacitor 203.

In the previous examples, the start of the fractional time intervals have been synchronized with (and specifically aligned to) the zero crossings of respectively the inductor voltage and the capacitor current. In particular, the start time of the fractional time intervals are aligned with the zero crossings of respectively the capacitor voltage and the inductor current. This provides particular advantages when the current flow between the transmitter capacitor 203 and transmitter inductor 103 is reduced completely to zero during the fractional time intervals. However, it will be appreciated that in some embodiments, more gradual reductions in the current flow may be used.

It will be appreciated that the slowing of the state change, and the energy flow between the transmitter capacitor 203 and the transmitter inductor 103, may be achieved by reducing rather than completely preventing current flow between the resonating components. The reduced current may for example be achieved through a current regulating circuit which e.g. could be controlled in real time by a microcontroller.

Figure 20:
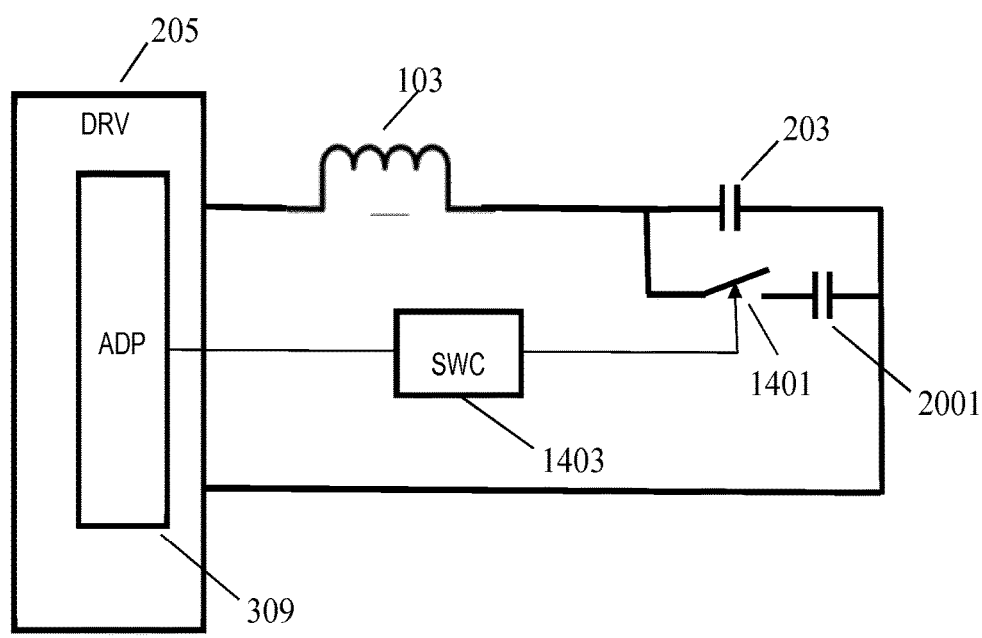
FIG. 20 illustrates an example of elements of a power transfer system in accordance with some embodiments of the invention.

However, as another example, the reduction may e.g. be achieved by including an additional capacitor or inductor during the fractional time intervals. For example, in the example of FIG. 20 an additional current reduction capacitor 2001 is inserted in series with the switch of FIG. 14. During the fractional time interval, the switch 1401 does not short circuit the transmitter capacitor 203 but inserts the current reduction capacitor 2001 in parallel. This results in the current to the transmitter capacitor 203 being reduced since part of the current flows into the current reduction capacitor 2001 during the fractional time interval thereby reducing the state change of the transmitter capacitor 203 and so the voltage that the transmitter capacitor 203 imposes on the transmitter coil 103 (the current reduction capacitor 1401 is charged and discharged together with the transmitter capacitor 203).

It will be appreciated that a corresponding approach can be used for the transmitter coil 103.

In the previous description, it has for brevity and clarity been assumed that the drive frequency is constant except for the frequencies caused by the frequency modulation, and specifically by frequency shift keying. Such embodiments may for example include systems wherein an accurate DDS approach is used to generate the drive frequency, and where power control is achieved by controlling the amplitude of the drive signal.

However, in other embodiments, the drive frequency may depend on other factors than just the frequency modulation, and thus the nominal (unmodulated) drive frequency may vary.

In some embodiments, the variation due to e.g. component variances and tolerances may result in drift and frequency variations which may potentially be significant enough to need taking into account when setting the resonance frequency. However, in most embodiments, the drive frequency is sufficiently accurate and well controlled to not require such variations to be taken into account.

Also, the previous description has focused on examples wherein the resonance frequency is controlled to be substantially identical to the drive frequency, i.e. where the resonance circuit is being biased towards being the same frequency as the drive frequency.

However, in some embodiments, the power transmitter may be arranged to actively vary the drive frequency in response to other factors, and/or may be arranged to be generate the drive signal such that the drive frequency differs from the resonance frequency.

Specifically, in some embodiments, the power transmitter may be arranged to vary the drive frequency in order to control the power transfer to the power receiver. For example, if the power receiver transmits power control messages that request that the power of the power transfer signal is reduced, then the power transmitter may change the drive frequency to deviate more from the resonance frequency. Conversely, if the power transmitter receives power control messages requesting increased power, the drive frequency may be arranged to be closer to the resonance frequency.

For example, during times when no frequency modulation is being employed (i.e. when no data symbols are transmitted to the power receiver), the resonance frequency may e.g. be set to a nominal value of, say, 100 kHz. The drive frequency may for a given power transfer level be set to, say, 98 kHz. If the power receiver requests an increased power level, the drive frequency may be increased until the desired power level is achieved, which e.g. may occur for a drive frequency of 99 kHz. Conversely, if reduced power is required, the drive frequency may be reduced, e.g. resulting in a drive frequency of 97 kHz. Thus, in such embodiments, a frequency offset may be introduced between the drive frequency and the resonance frequency in order to achieve a desired power transfer level. Further, the offset may be dynamically varied, typically in response to power control messages received from the power receiver.

In such embodiments, the frequency modulation results in a frequency variation which overlays the current nominal drive frequency. The frequency variations of the frequency modulation are typically substantially faster than the frequency variation due to the power control and the power receiver can accordingly detect these faster frequency variations in order to decode the transmitted data. For example, the frequency of a local oscillator may be locked to the average frequency of the received power transfer signal by a slow Phase Locked Loop.

In such embodiments, the resonance frequency may be varied to follow the frequency variations in the drive signal resulting from the frequency modulation but to not follow the frequency variations resulting from the power control. Specifically, the resonance frequency may be adapted to maintain the same average frequency offset between the resonance frequency and the drive frequency as the drive frequency changes due to the frequency modulation. Specifically, the drive frequency may depend on both the data values and the control error messages whereas the resonance frequency depends only on the control error messages.

For example, if the frequency modulation is a frequency shift keying which uses two frequencies that are respectively −500 Hz and 500 Hz offset from the nominal drive frequency, the adapter 309 may be arranged to change the resonance frequency by −500 Hz and +500 Hz respectively in synchronization with the frequency shift keying. Thus, if the current power control has resulted in the nominal drive frequency being 98 kHz, the adapter 309 can shift the resonance frequency between 97.5 kHz and 98.5 kHz respectively in accordance with the frequency deviation due to the frequency shift keying. If the nominal drive frequency (resulting from the power control) is 99 kHz, the adapter 309 can shift the resonance frequency between 98.5 kHz and 99.5 kHz respectively.

As a specific example, in the Qi specification the frequency modulation depth is determined by the difference in cycle length: Depth=(1/fmod−1/fop), with fop being the operating (or drive) frequency and fmod being the modulated frequency. The depth is expressed in ns. The adapter 309 may be arranged to follow the changes corresponding to the modulation depth and specifically can be arranged to follow the nodulation frequency changes fmod.

Specifically, in the previous example where a state change is frozen for a fractional time interval, the difference in the duration of the fractional time interval between the two resonance frequencies corresponding to the two frequency shift keying frequencies, i.e. Thold, may be set equal to this depth. In other words, in the previous example, the difference between the two durations of the fractional time interval (i.e. the difference between the two Thold values)

can be set to be equal to the difference between cycle times for the two frequency shift keying frequencies. This corresponds to the modulation depth definition used for the Qi Specification (which is defined by cycle times).

Thus, it will be appreciated that the frequency variation of the resonance frequency in response to the frequency modulation may be a relative or differential frequency variation. The frequency modulation may introduce a varying frequency offset which is dependent on the data being transmitted and the adapter 309 may be arranged to vary the resonance frequency by a corresponding frequency offset.

Thus, in some embodiments, a power transmitter may control the power signal by varying the drive frequency. For example, a power transmitter that operates with a drive frequency above the resonance frequency of the resonance circuit may increase the power signal by lowering the drive frequency towards the resonance frequency. The frequency modulation may thus add a delta or differential to a nominal drive frequency (which e.g. may be an average drive frequency or a drive frequency in the absence of frequency modulation), and the variation of the resonance frequency may thus also be a delta or differential to a nominal resonance frequency corresponding to the nominal drive frequency.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A power transmitter comprising:
a variable resonance circuit, wherein the variable resonance circuit is configured to generate a power transfer signal in response to a drive signal, wherein the variable resonance circuit comprises a capacitive impedance and an inductive impedance, wherein the inductive impedance comprises a transmitter coil, wherein the transmitter coil is arranged to generate the power transfer signal, wherein the variable resonance circuit has a variable resonance frequency, wherein the variable resonance frequency is arranged by varying at least one of the capacitive impedance and the inductive impedance in response to a control signal;
a driver circuit, wherein the driver circuit is configured to generate the drive signal for the variable resonance circuit, wherein the drive signal has a variable drive frequency;
a frequency modulator, wherein the frequency modulator is configured to apply a frequency modulation to the drive signal by varying the variable drive frequency in response to data values, wherein the data values are transmitted to a power receiver; and
an adapter circuit, wherein the adapter circuit is configured to generate the control signal in response to the data values such that the variable resonance frequency follows variations in the variable drive frequency.

2. The power transmitter of claim 1, wherein the frequency modulator is arranged to select the variable drive frequency from a set of frequencies in response to the data values, wherein the adapter circuit is arranged to generate the control signal to adapt at least one of the capacitive impedance and the inductive impedance between a set of impedances, wherein the set of impedances corresponds to variable resonance frequencies, wherein the variable resonance frequencies correspond to the set of frequencies.

3. The power transmitter of claim 1, wherein the adapter circuit is arranged to generate the control signal to have transitions, wherein the transitions are synchronized to transitions of the variable drive frequency between at least two of a set of frequencies.

4. The power transmitter of claim 1, wherein the adapter circuit is arranged to generate the control signal to have transitions, wherein the transitions are synchronized to at least one data symbol time(s) of the frequency modulation.

5. The power transmitter of claim 1, wherein the variable resonance circuit comprises a switch, wherein the switch is arranged to limit a current flow to a reactive component of at least one of the capacitive impedance and the inductive impedance in response to the control signal.

6. The power transmitter of claim 5, wherein the control signal is a binary control signal, wherein the switch is arranged in an open state in response to a first value of the binary control signal and in a closed state in response to a second value of the binary control signal.

7. The power transmitter of claim 5, wherein the adapter circuit is arranged to change the control signal only when the frequency modulation causes the variable drive frequency to change.

8. The power transmitter of claim 1, wherein the capacitive impedance comprises a switch, wherein the switch is arranged to short circuit and/or disconnect a portion of the capacitive impedance in response to the control signal.

9. The power transmitter of claim 1, wherein the inductive impedance comprises a switch, wherein the switch is arranged to short circuit and/or disconnect a portion of the inductive impedance in response to the control signal.

10. The power transmitter of claim 1, wherein the variable resonance circuit comprises a resonance modification circuit, wherein the resonance modification circuit is configured to control the variable resonance frequency by slowing a state change for at least one of the capacitive impedance and the inductive impedance for a fractional time interval of at least a portion of cycles of the drive signal, wherein the resonance modification circuit is arranged to adapt the duration of the fractional time interval in response to the control signal.

11. The power transmitter of claim 10, wherein the resonance modification circuit is arranged to determine one of a start time and an end time of the fractional time interval in response to a signal of the variable resonance circuit, wherein the resonance modification circuit is arranged to determine the other of the start time and the end time in response to the control signal.

12. The power transmitter of claim 1, wherein the frequency modulator is arranged to cause frequency transitions in the variable drive frequency, wherein the adapter circuit is arranged to generate the control signal to cause transitions in the variable resonance frequency, wherein the transitions are synchronized to the frequency transitions of the variable drive frequency.

13. The power transmitter of claim 1, wherein the frequency modulator is arranged to cause frequency transitions during a data symbol, wherein the circuit adapter is arranged to generate the control signal to cause transitions in the variable resonance frequency during the data symbol.

14. A wireless power transfer system comprising a power transmitter and a power receiver, the power transmitter comprising:
 a variable resonance circuit, wherein the variable resonance circuit is configured to generate a power transfer signal in response to a drive signal, wherein the variable resonance circuit comprises a capacitive impedance and an inductive impedance, wherein the inductive impedance comprises a transmitter coil, wherein the transmitter coil is arranged to generate the power transfer signal, wherein the variable resonance circuit has a variable resonance frequency, wherein the variable resonance frequency is arranged by varying at least one of the capacitive impedance and the inductive impedance in response to a control signal;
 a driver circuit, wherein the driver circuit is configured to generate the drive signal for the variable resonance circuit, wherein the drive signal has a variable drive frequency;
 a frequency modulator, wherein the frequency modulator is configured to apply a frequency modulation to the drive signal by varying the variable drive frequency in response to data values, wherein the data values are transmitted to the power receiver; and
 an adapter circuit, wherein the adapter circuit is configured to generate the control signal in response to the data values such that the variable resonance frequency follows variations in the variable drive frequency.

15. A method of operation of a power transmitter the power transmitter comprising a variable resonance circuit, wherein the variable resonance circuit is configured to generate a power transfer signal in response to a drive signal, wherein the variable resonance circuit comprises a capacitive impedance and an inductive impedance, wherein the inductive impedance comprises a transmitter coil, wherein the transmitter coil is arranged to generate the power transfer signal, wherein the variable resonance circuit has a variable resonance frequency, wherein the variable resonance frequency is arranged by varying at least one of the capacitive impedance and the inductive impedance in response to a control signal; the method comprising:
 generating the drive signal for the variable resonance circuit, wherein the drive signal has a variable drive frequency;
 applying a frequency modulation to the drive signal by varying the variable drive frequency in response to data values, wherein the data values are transmitted to a power receiver; and
 generating the control signal in response to the data values such that the variable resonance frequency follows variations in the variable drive frequency resulting from the frequency modulation of the drive signal.

16. The method of claim 15, further comprising:
 selecting the variable drive frequency from a set of frequencies in response to the data values; and
 generating the control signal to adapt at least one of the capacitive impedance and the inductive impedance between a set of impedances, wherein the set of impedances corresponds to at least one variable resonance frequency, wherein the variable resonance frequencies correspond to the set of frequencies.

17. The method of claim 15, further comprising:
 generating the control signal to have transitions, wherein the transitions are synchronized to transitions of the variable drive frequency between at least two frequencies.

18. The method of claim 15, further comprising:
 generating the control signal to have transitions, wherein the transitions are synchronized to at least one data symbol time(s) of the frequency modulation.

19. The method of claim 15, further comprising:
 limiting a current flow to a reactive component of at least one of the capacitive impedance and the inductive impedance in response to the control signal.

20. A computer program stored on a non-transitory medium, wherein the computer program when executed on a processor performs the method as claimed in claim 15.

* * * * *